(12) United States Patent
Yamauchi et al.

(10) Patent No.: US 8,218,249 B2
(45) Date of Patent: Jul. 10, 2012

(54) LENS BARREL AND IMAGING APPARATUS

(75) Inventors: Yasuteru Yamauchi, Tokyo (JP);
Satoshi Shirakata, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/973,005

(22) Filed: Dec. 20, 2010

(65) Prior Publication Data

US 2011/0157729 A1    Jun. 30, 2011

(30) Foreign Application Priority Data

Dec. 30, 2009   (JP) .................................. 2009-299298

(51) Int. Cl.
*G02B 15/14* (2006.01)
(52) U.S. Cl. ......... 359/699; 359/700; 359/701; 396/349
(58) Field of Classification Search .......... 359/694–704, 359/823–825; 396/72–75, 144, 349; 348/340, 348/E5.024
See application file for complete search history.

(56) References Cited

U.S. PATENT DOCUMENTS

| | | | | |
|---|---|---|---|---|
| 5,270,868 | A  * | 12/1993 | Nomura | 359/700 |
| 6,987,930 | B2 * | 1/2006 | Nomura | 396/73 |
| 7,394,600 | B2 * | 7/2008 | Yasutomi et al. | 359/699 |
| 7,452,141 | B2 * | 11/2008 | Kobayashi | 396/349 |
| 7,953,317 | B2 * | 5/2011 | Sasaki | 396/85 |

FOREIGN PATENT DOCUMENTS

JP    2005-308852 A   11/2005

* cited by examiner

*Primary Examiner* — Loha Ben
(74) *Attorney, Agent, or Firm* — Wolf, Greenfield & Sacks, P.C.

(57) ABSTRACT

A lens barrel includes: a holding frame; a cam ring rotatable relative to the holding frame around a rotational axis substantially parallel to an optical axis of an imaging optical lens system; and a cam follower and a cam groove that engage with each other so that the holding frame and the cam ring move relative to each other along the optical axis when the holding frame and the cam ring are rotated relative to each other.

6 Claims, 19 Drawing Sheets

FIG.2
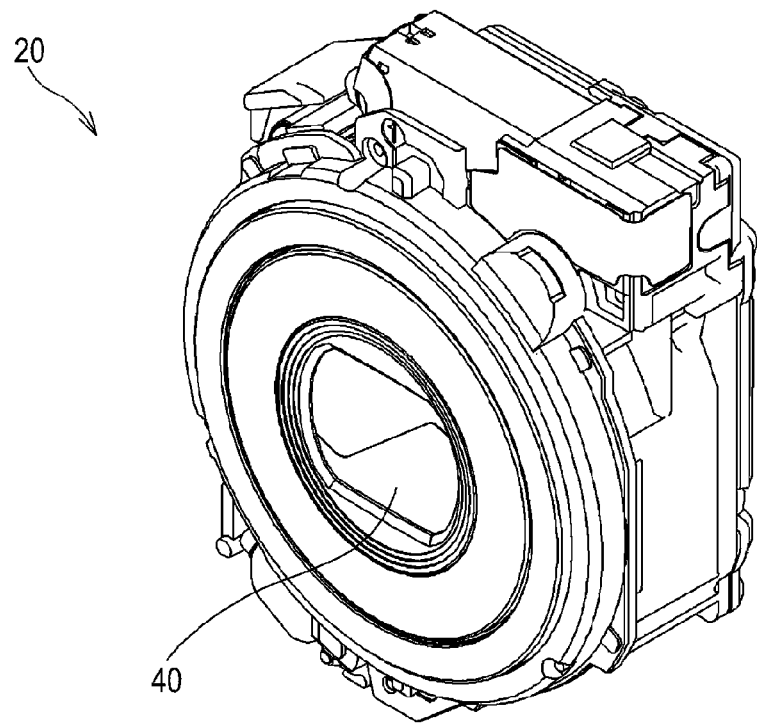
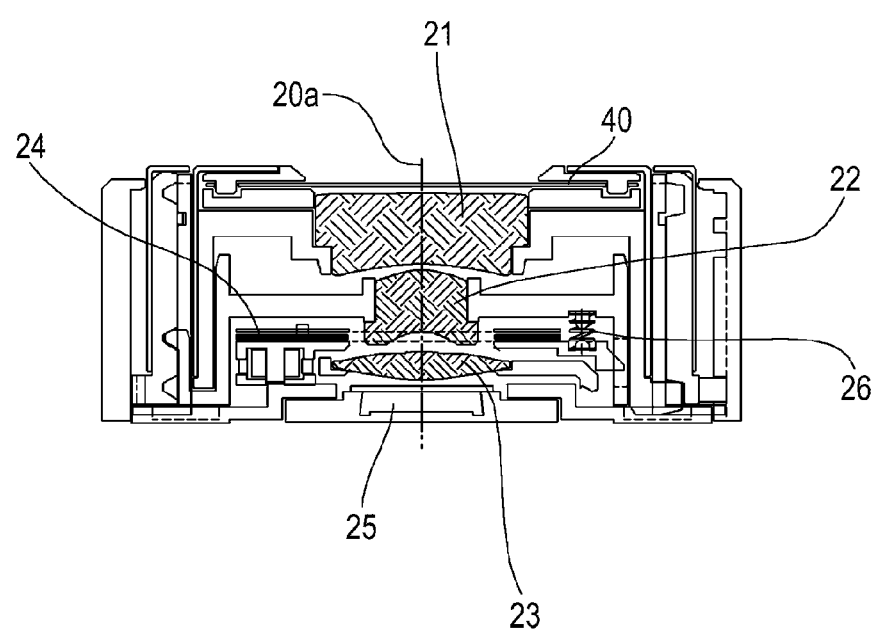

FIG.3
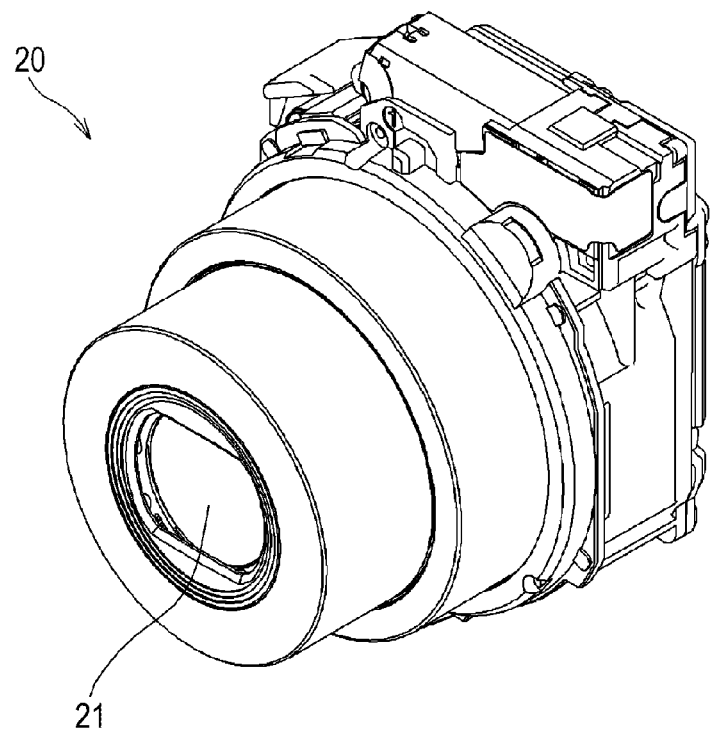
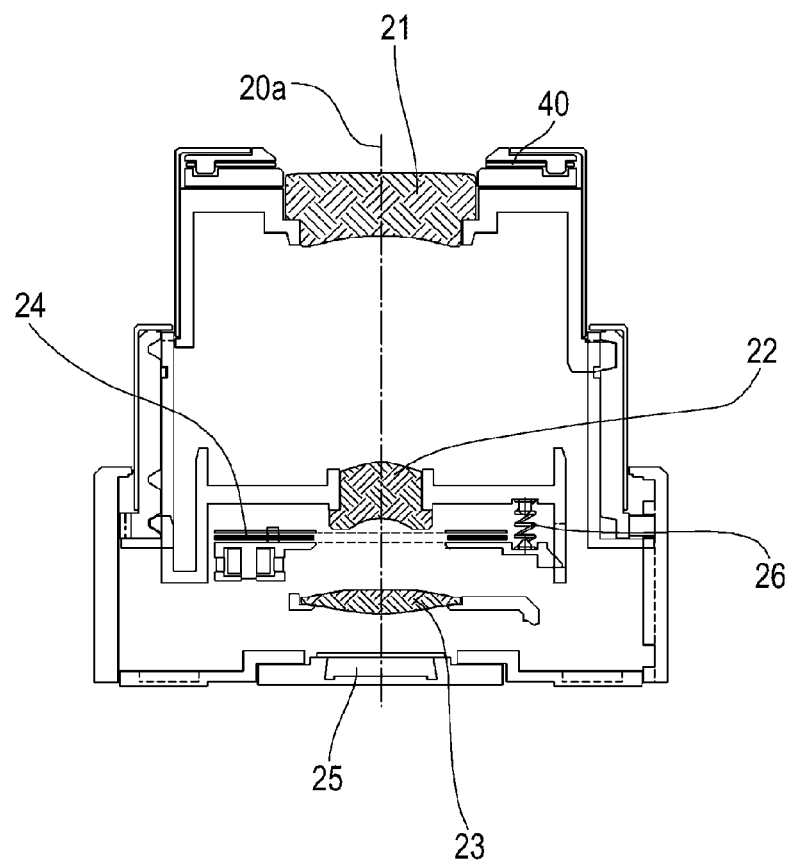

FIG.4
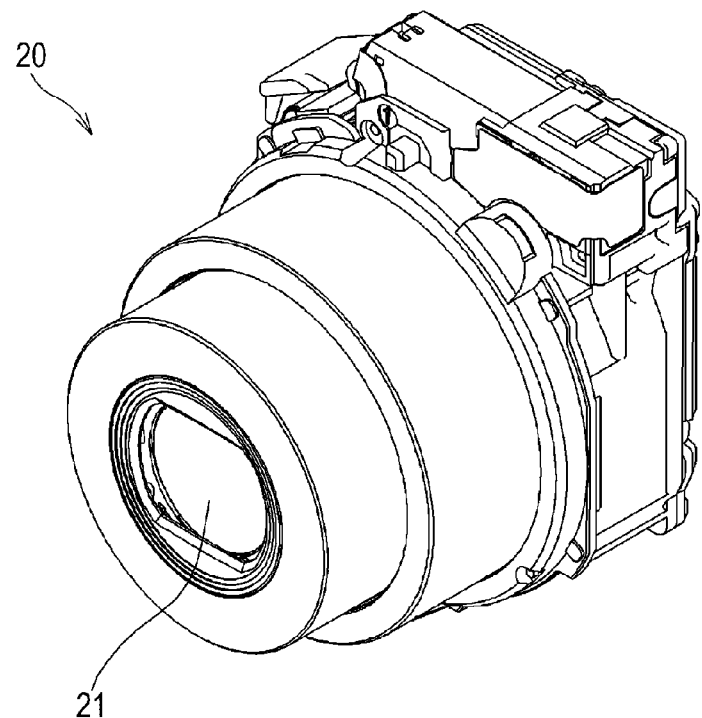
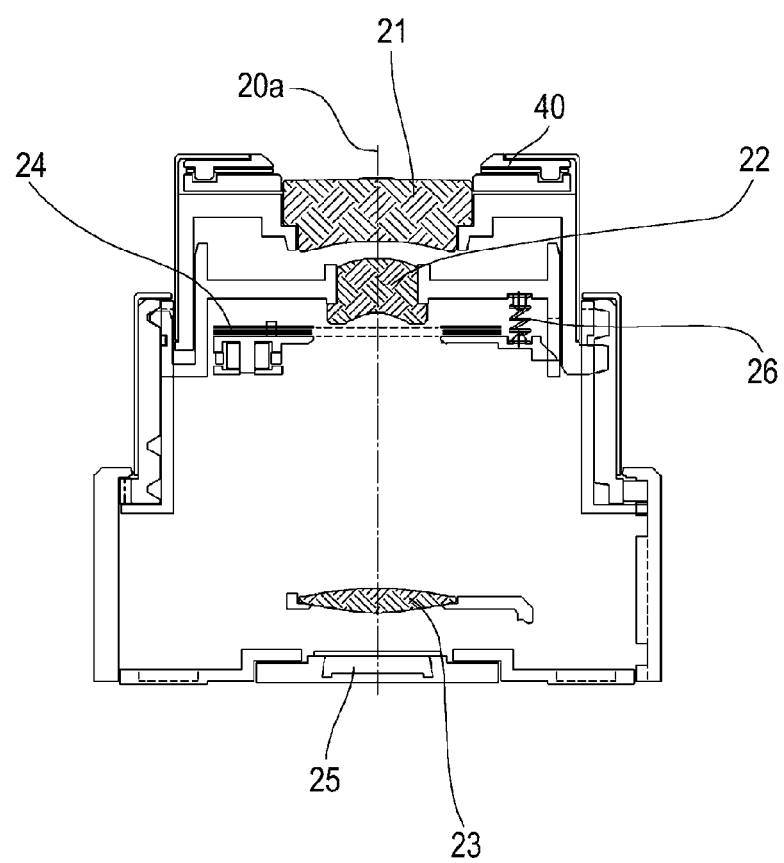

FIG.8
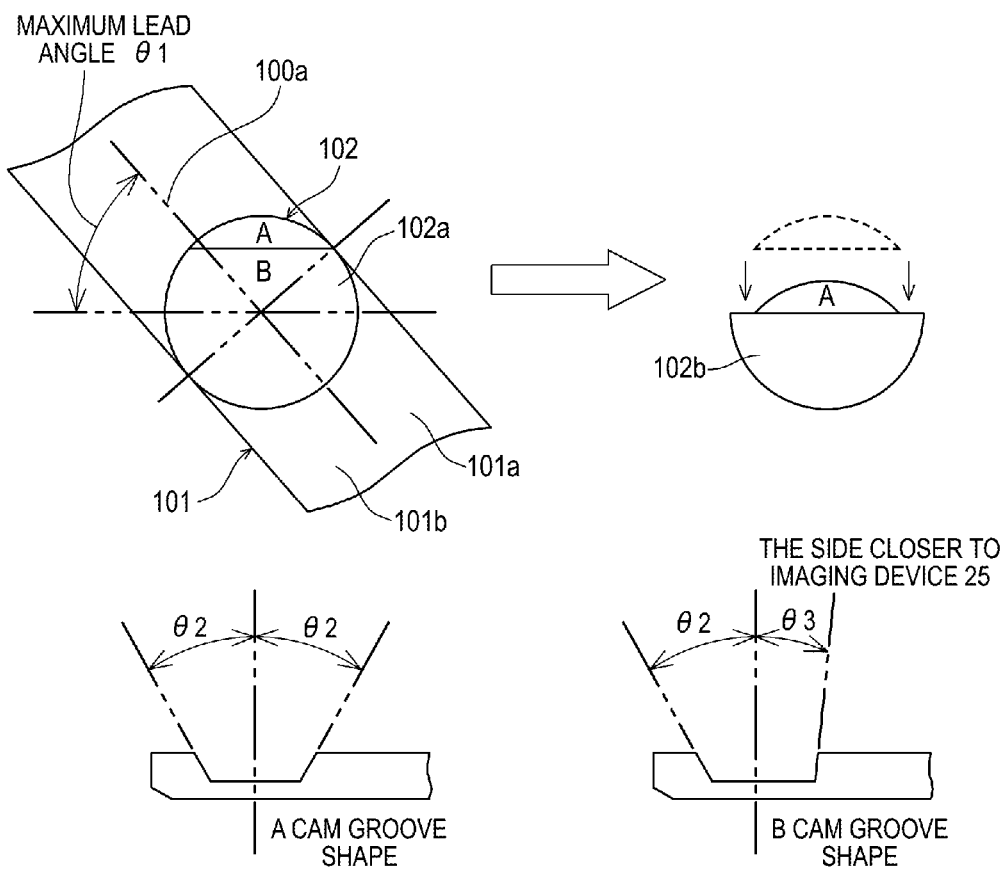
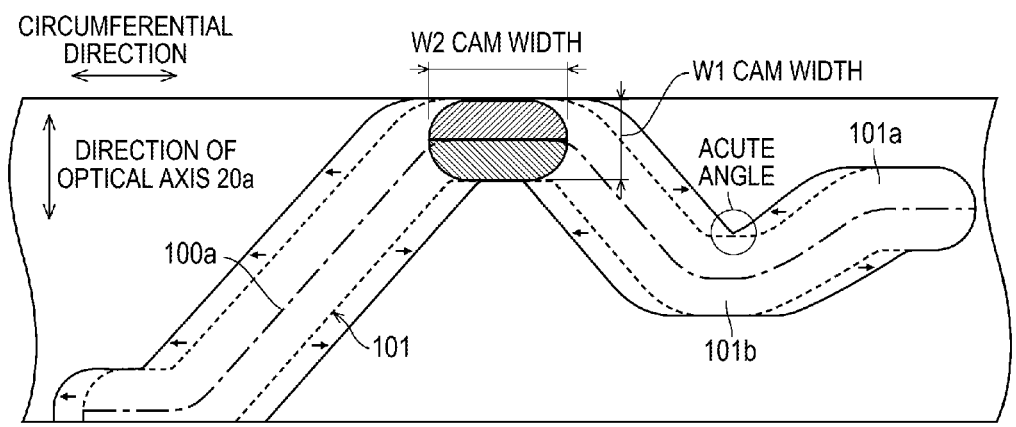

FIG.9
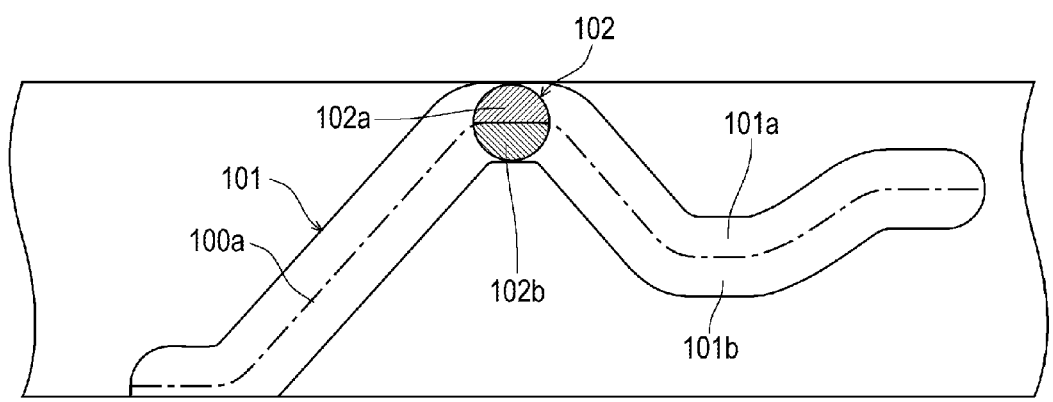
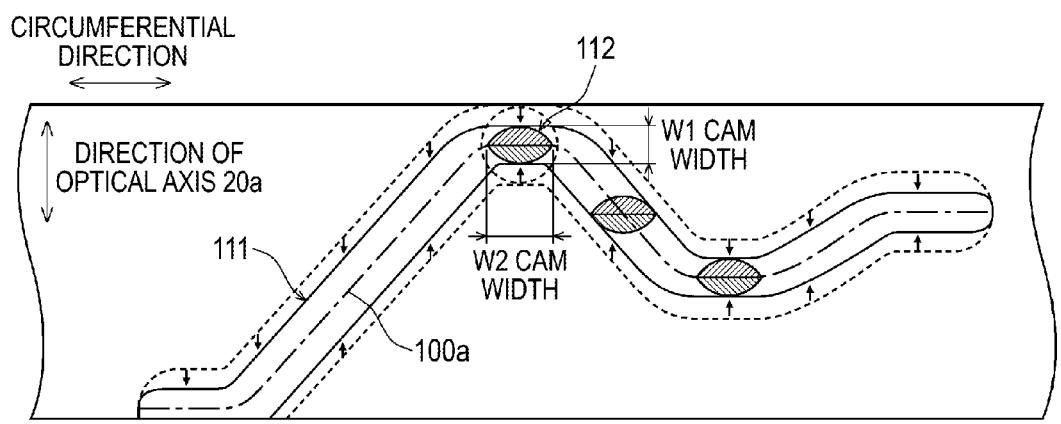

FIG.10
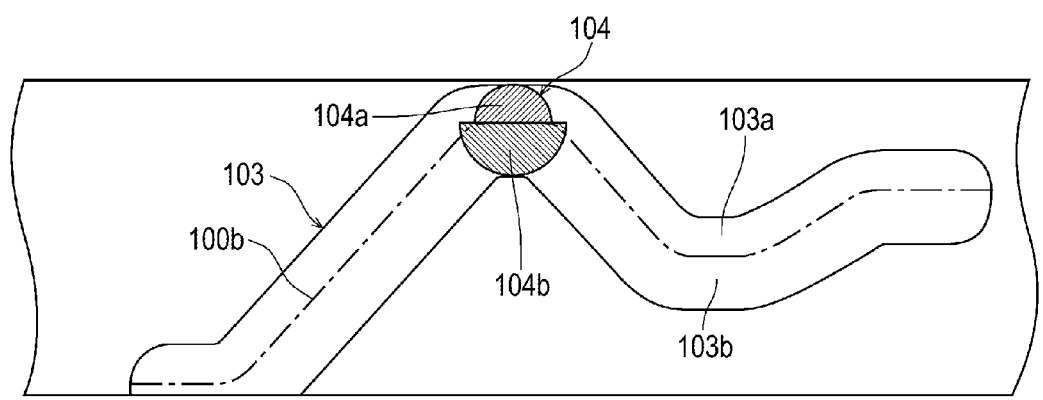
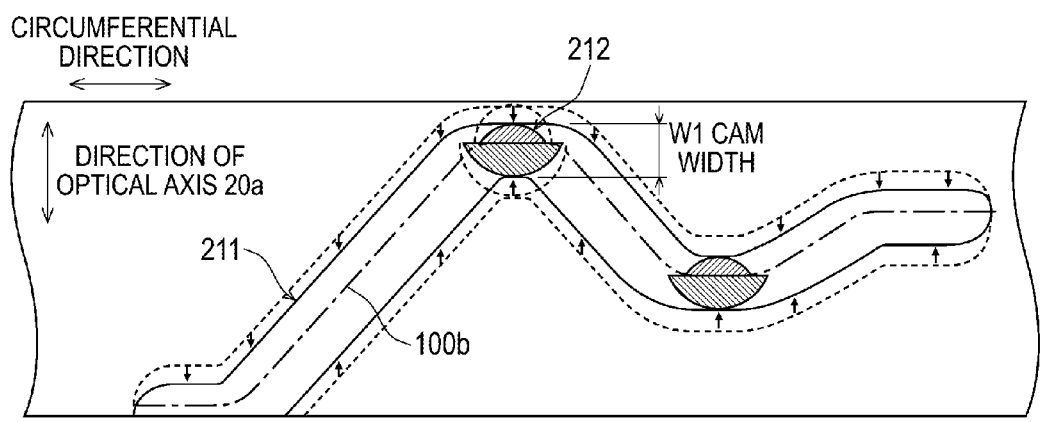

FIG.11
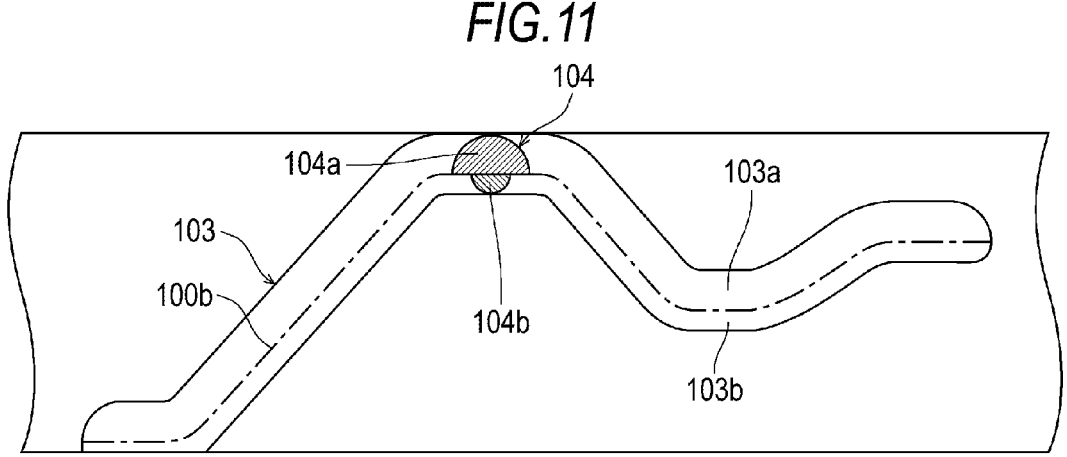
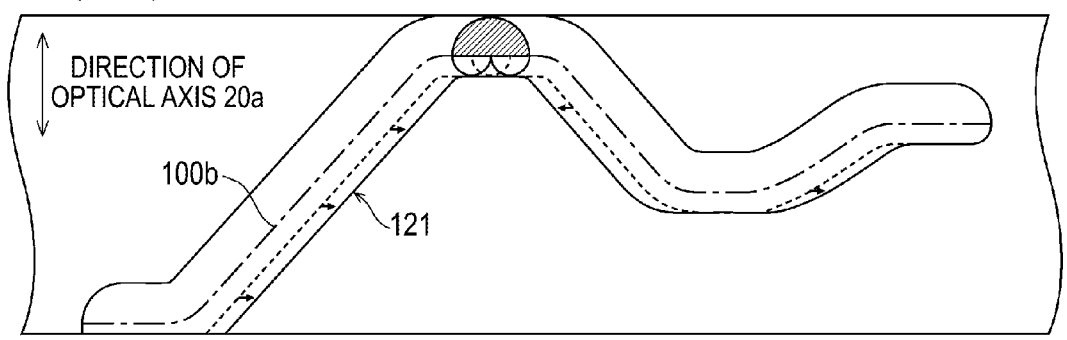
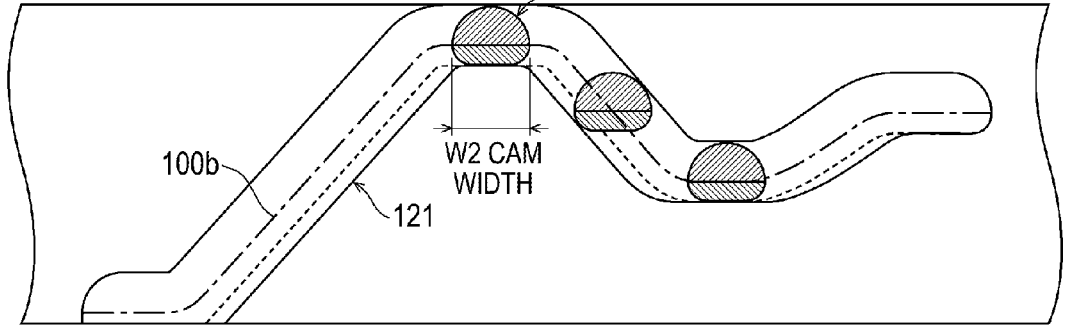

FIG.12
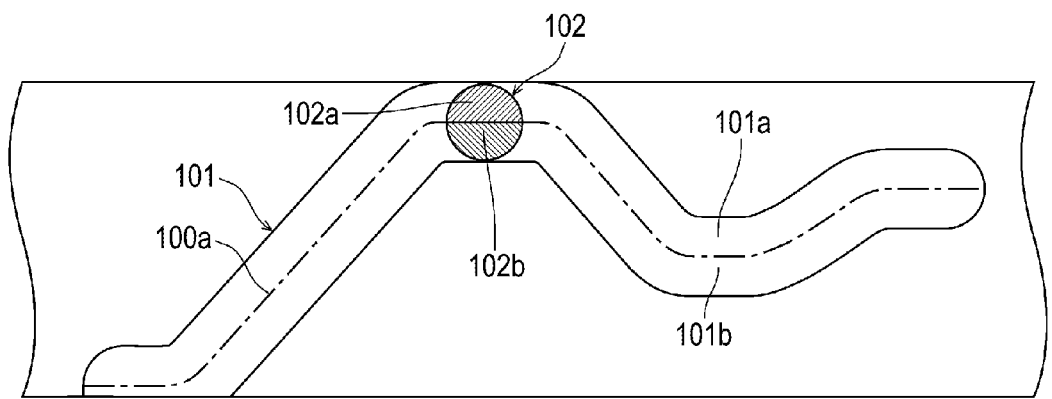
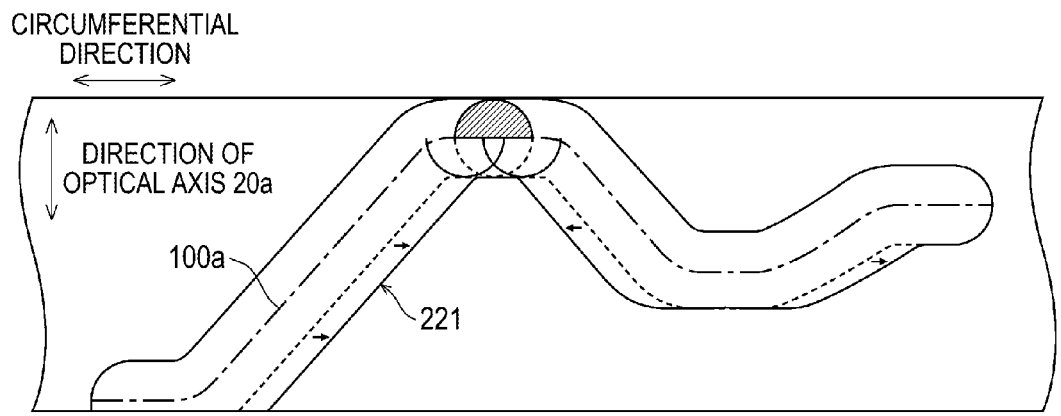
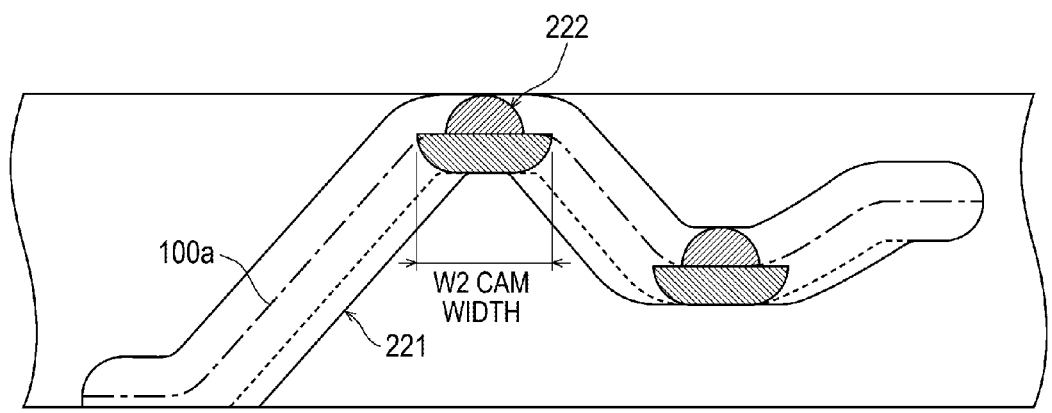

FIG.13
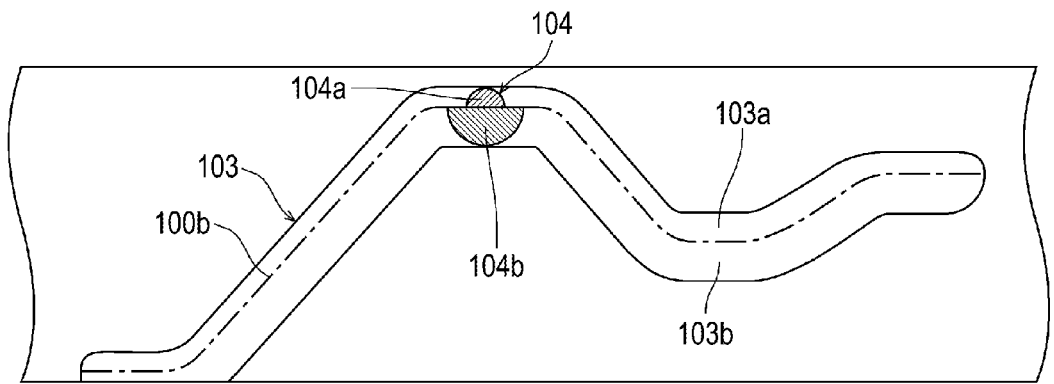
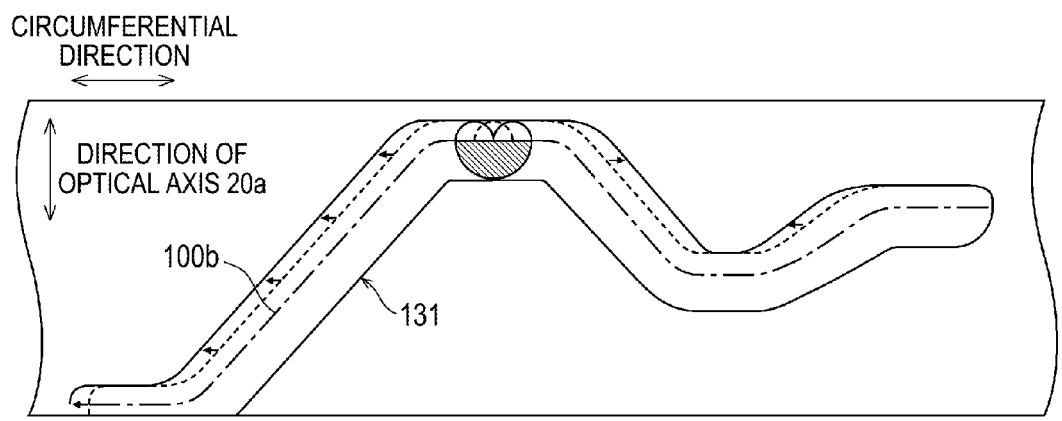
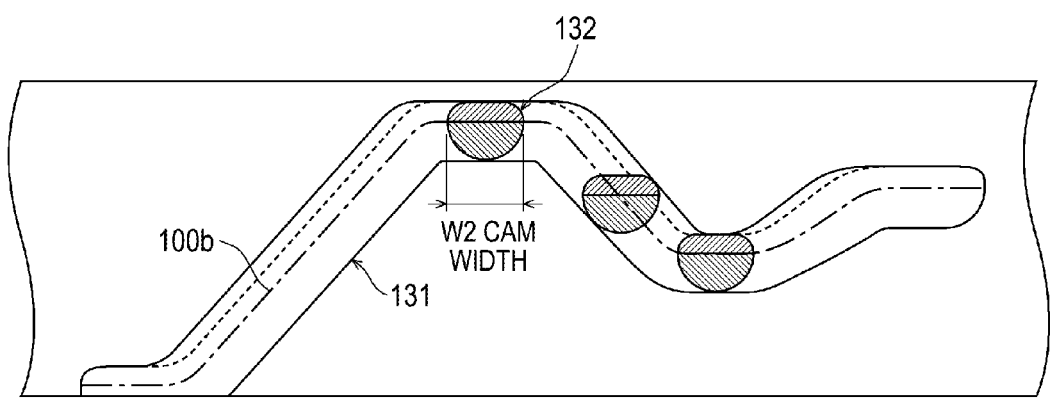

FIG.14
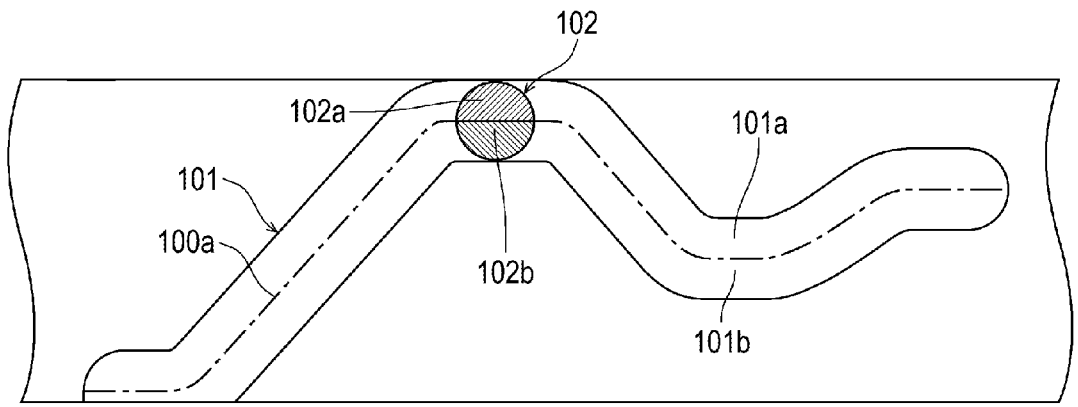
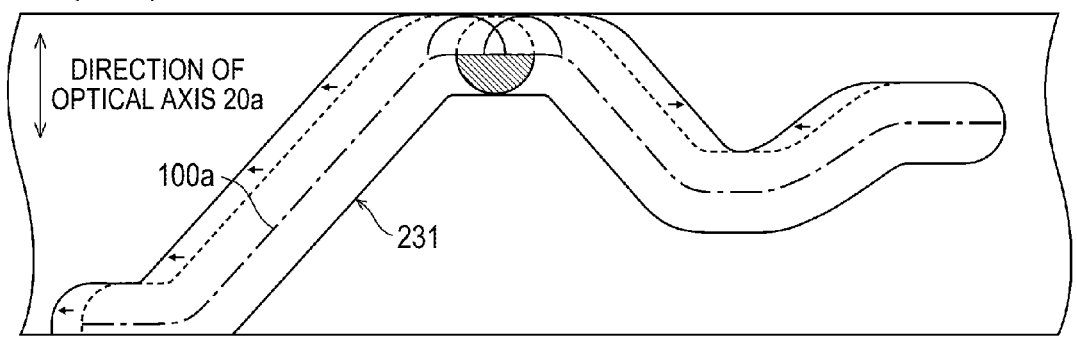
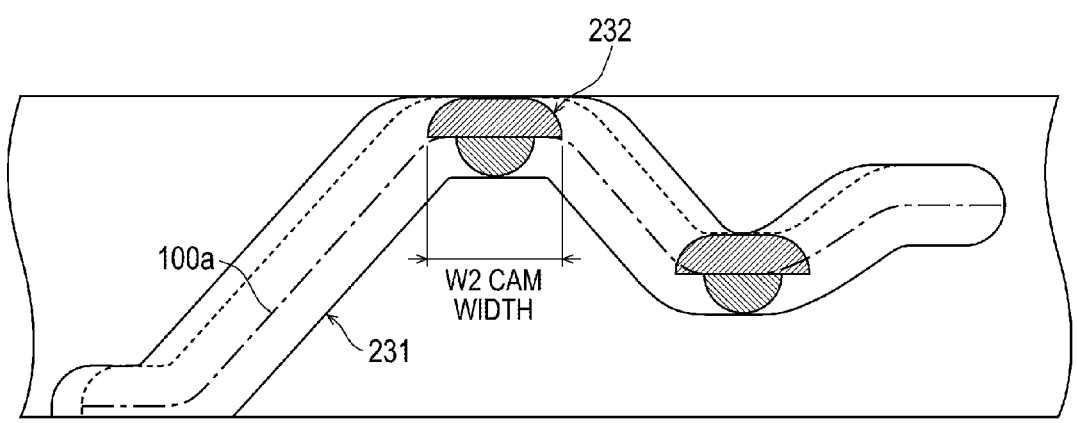

FIG.15
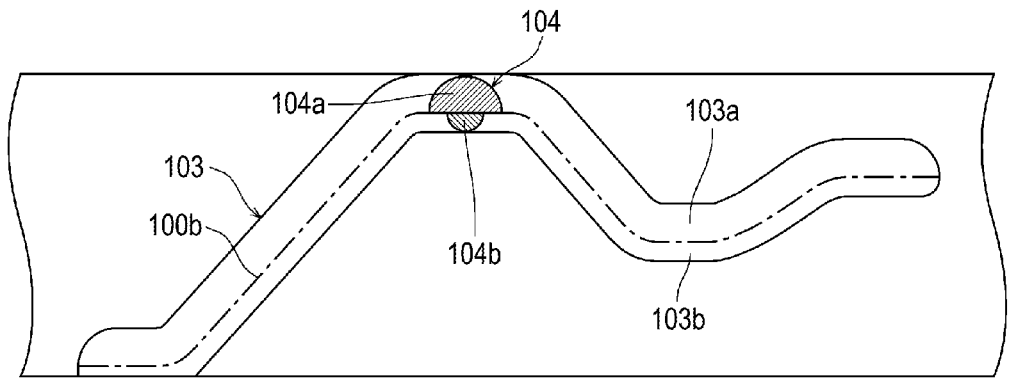
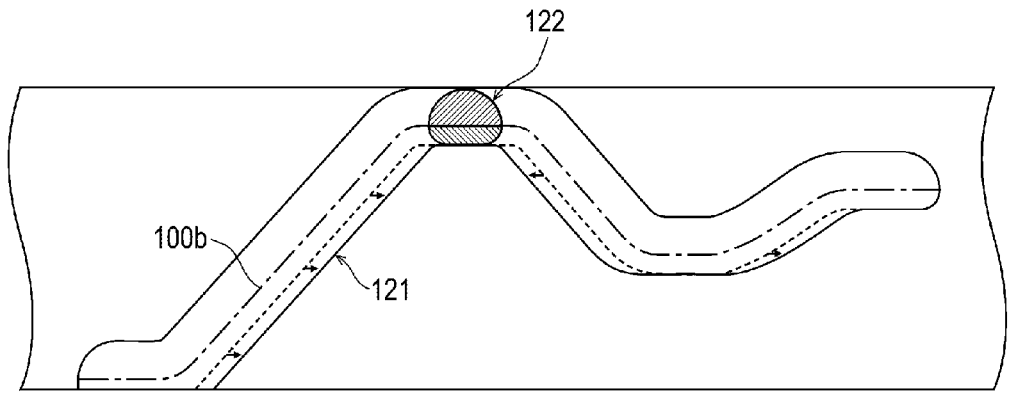
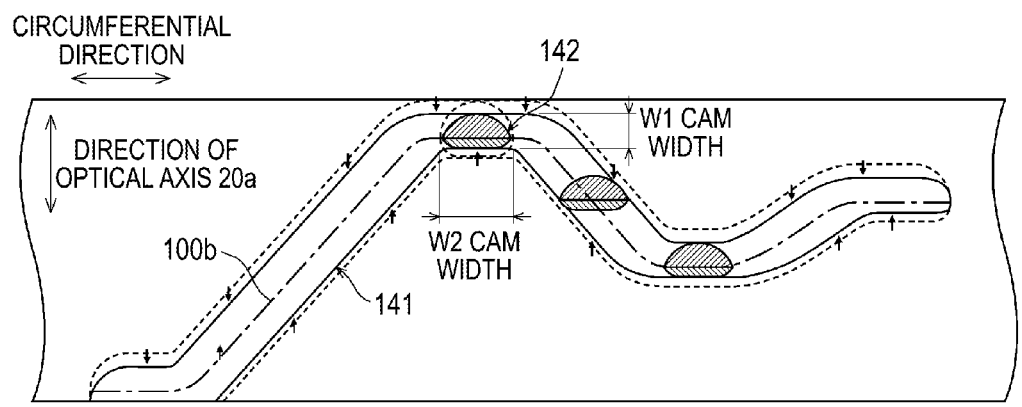

FIG. 16
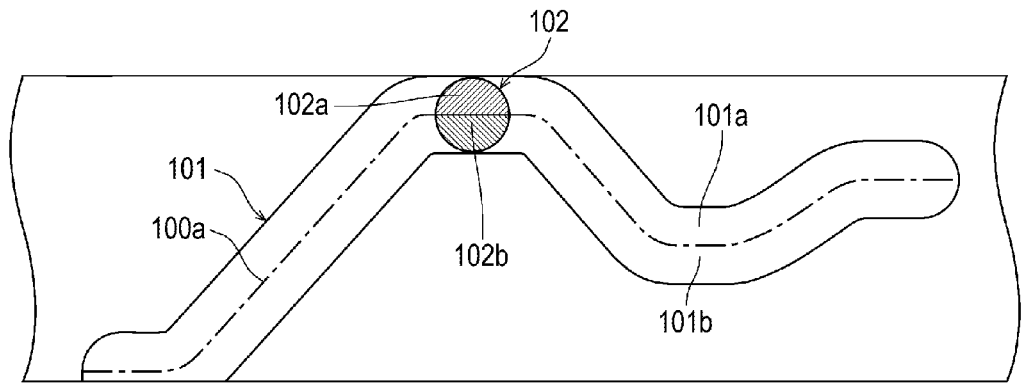
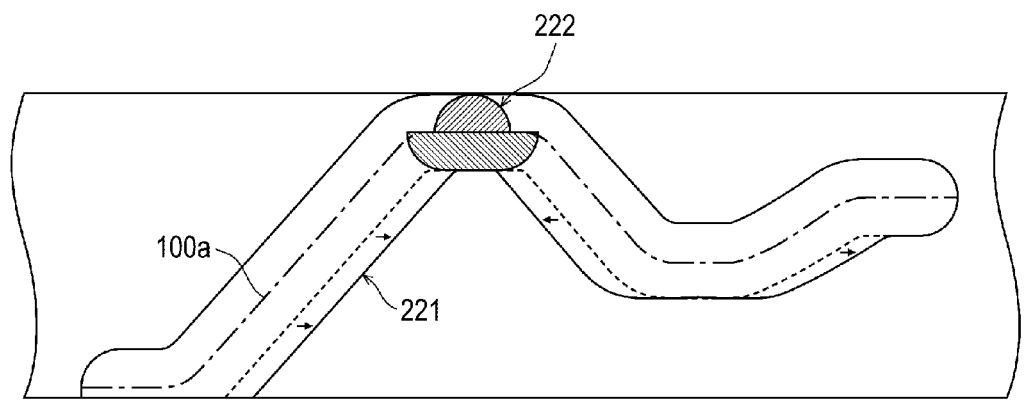
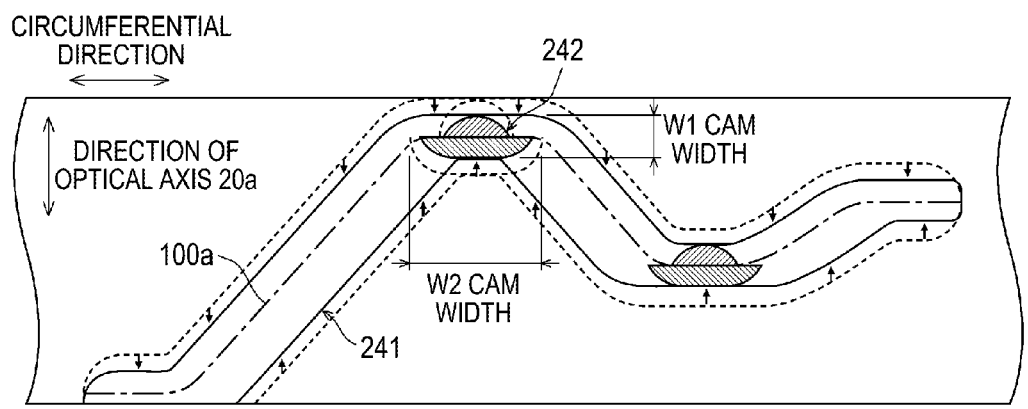

FIG.17
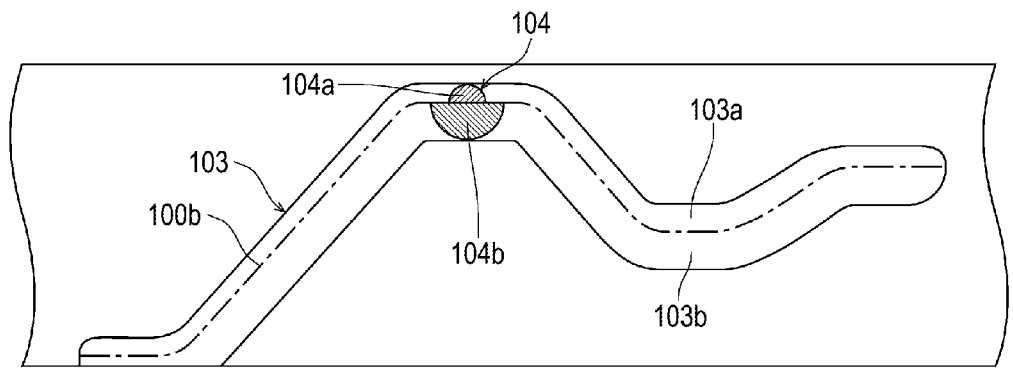
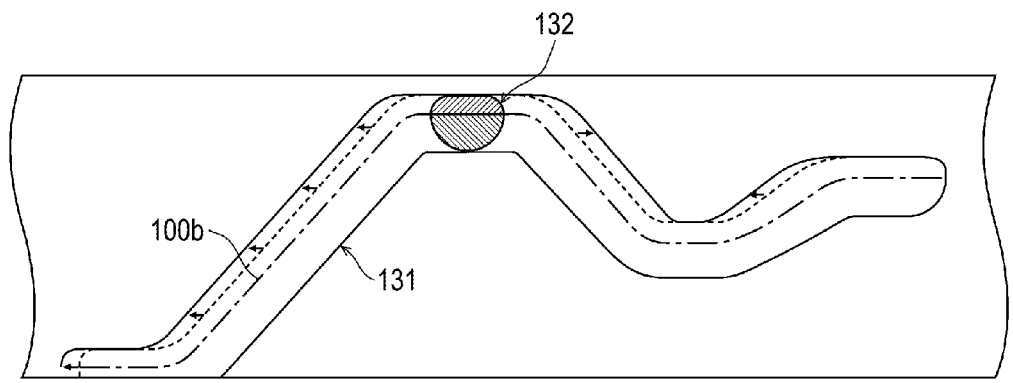
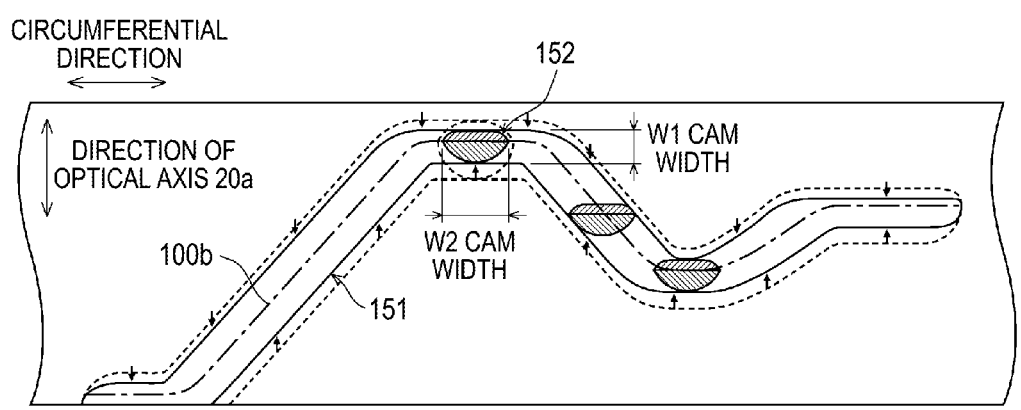

FIG.18
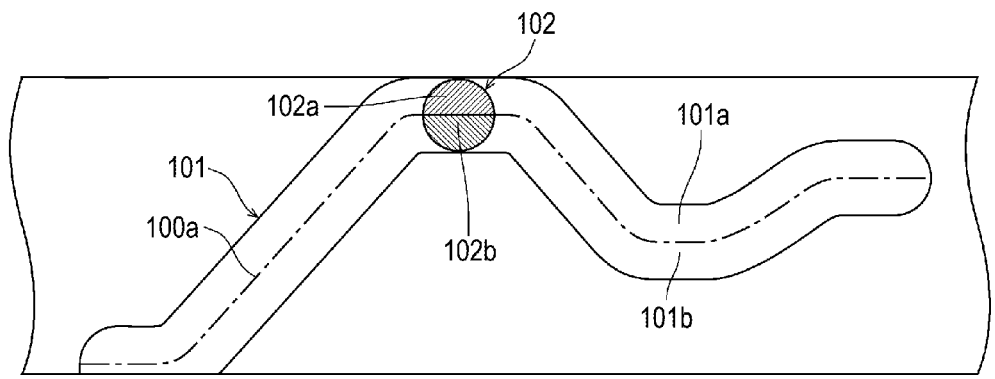
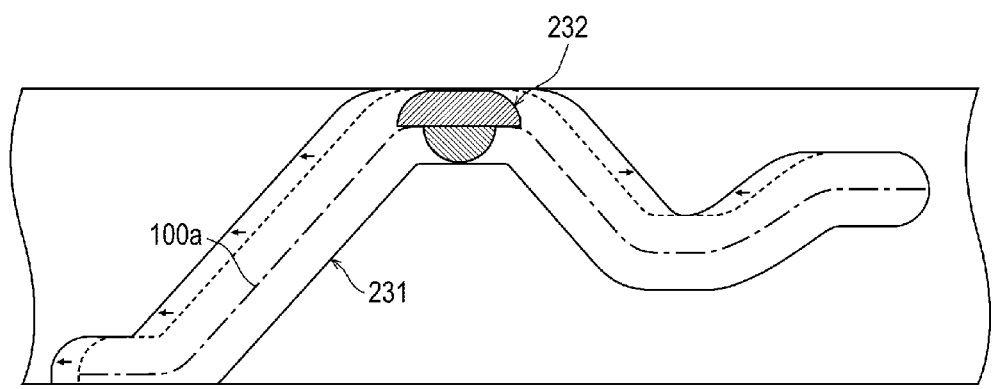
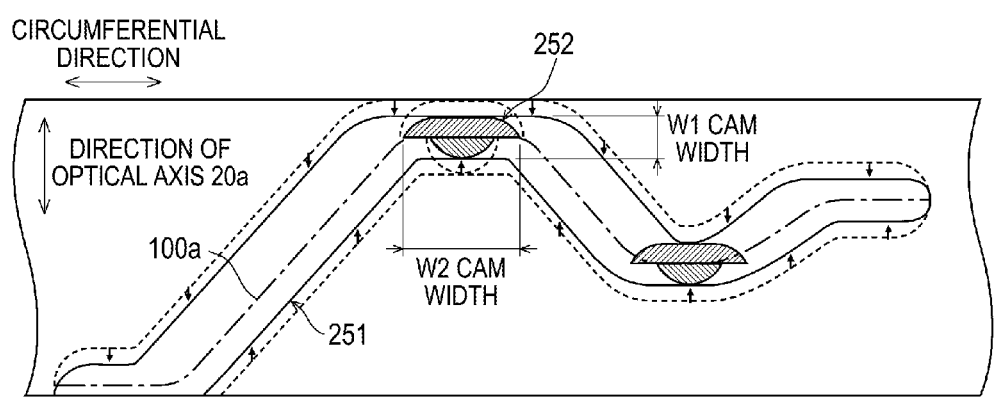

FIG.19
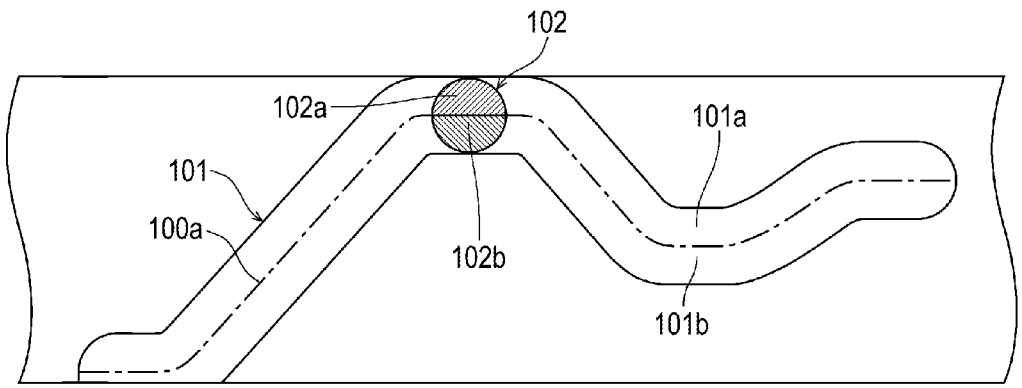
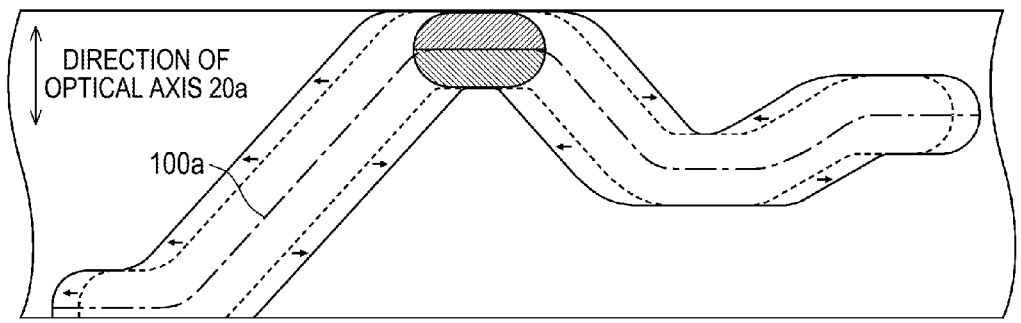
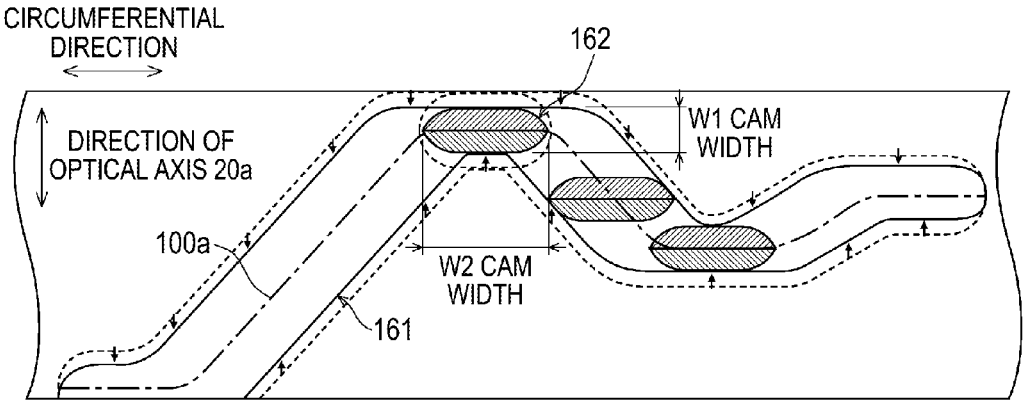

LENS BARREL AND IMAGING APPARATUS

BACKGROUND OF THE INVENTION

1. Field of the Invention

The present invention relates to a lens barrel and an imaging apparatus including a cam follower and a cam groove that engage with each other so that a holding frame and a cam ring move relative to each other in the optical axis direction.

2. Description of the Related Art

Digital video camcorders, digital still cameras, and other imaging apparatus form a subject image through an imaging lens and capture the subject image with a CCD (Charge Coupled Device) image sensor, a CMOS (Complementary Metal Oxide Semiconductor) image sensor, or any other imaging device disposed downstream of the imaging lens. Some of the imaging apparatus are small and thin when they are not in operation by employing a collapsible lens barrel in which rotating a cam ring causes a movable frame to move in the optical axis direction of the imaging lens.

As a known collapsible lens barrel, there is a lens barrel which includes a cam ring having a cam groove formed in a circumferential surface thereof and a movable frame having a cam follower that engages with the cam groove and in which relative rotation between the cam ring and the movable frame around the optical axis causes relative movement between the cam ring and the movable frame in the optical axis direction. There is also a technology for achieving further reduction in size and thickness of a lens barrel and an imaging apparatus in their collapsed states by forming a cam groove with its cam groove surface shifted and a cam follower that engages with the cam groove so that the length of a cam ring in the optical axis direction is reduced.

SUMMARY OF THE INVENTION

In recent imaging apparatus in which reduction in size (thickness) is increasingly desired, reduction in size of a lens barrel is greatly desired. The size reduction achieved in JP-A-2005-308852 is not enough but more size reduction is desired. To this end, it is conceivable to reduce the size of the cam ring in the optical axis direction of the imaging lens, but in this case the travel of the movable frame, which holds the imaging lens, decreases, resulting in decrease in optical performance and decrease in commercial value of the lens barrel itself. It is alternatively conceivable to simply reduce the groove width of the cam groove, but in this case the cam follower, which engages with the cam groove, also needs to be reduced in size, resulting in decrease in mechanical strength of the cam follower.

It is therefore desirable to further reduce the size and the thickness of a collapsible lens barrel without decrease in travel of an imaging lens and mechanical strength thereof.

According to one embodiment of the invention, there is provided a lens barrel including a holding frame, a cam ring rotatable relative to the holding frame around a rotational axis substantially parallel to an optical axis of an imaging optical lens system, and a cam follower and a cam groove that engage with each other so that the holding frame and the cam ring move relative to each other along the optical axis when the holding frame and the cam ring are rotated relative to each other. When a shape based on which the shape of the cam groove is determined is defined as a basic cam groove, a groove surface positioned on an object side or an eyepiece side of a basic track of the basic cam groove is defined as a first basic cam groove surface, and a groove surface positioned on the other side is defined as a second basic cam groove surface, the cam groove has a shape produced by first shifting two portions of the second basic cam groove surface relative to each other in a circumferential direction of the cam ring and combining the shifted and non-shifted portions to form a basic cam groove surface and then shifting the thus produced basic cam groove surface and the first basic cam groove surface relative to each other in a direction parallel to the optical axis and combining the thus shifted cam groove surfaces so that the resultant groove width in the direction parallel to the optical axis is reduced.

According to another embodiment of the invention, there is provided a lens barrel including the same components as those in the one embodiment of the invention described above but different therefrom in that the cam groove has a shape produced by first shifting two portions of the second basic cam groove surface relative to each other in a circumferential direction of the cam ring and combining the shifted and non-shifted portions to form a basic cam groove surface and then combining the thus produced basic cam groove surface and the first basic cam groove surface. According to still another embodiment of the invention, there is provided a lens barrel including the same components as those in the one embodiment of the invention described above but different therefrom in that the cam groove has a shape produced by shifting the first basic cam groove surface and the second basic cam groove surface relative to each other in a direction parallel to the optical axis and combining the shifted two basic cam groove surfaces so that the resultant groove width in the direction parallel to the optical axis is reduced.

According to yet another embodiment of the invention, there is provided an imaging apparatus including the same holding frame, cam ring, cam follower, and cam groove as those in the one embodiment of the invention described above.

In the embodiments of the invention described above, the cam groove has a shape produced by first shifting two portions of the second basic cam groove surface relative to each other in a circumferential direction of the cam ring and combining the shifted and non-shifted portions to form a basic cam groove surface and then shifting the thus produced basic cam groove surface and the first basic cam groove surface relative to each other in a direction parallel to the optical axis and combining the thus shifted cam groove surfaces so that the resultant groove width in the direction parallel to the optical axis is reduced. The cam groove and the cam follower can therefore be reduced in size in the optical axis direction.

In the another embodiment of the invention, the cam groove has a shape produced by first shifting two portions of the second basic cam groove surface relative to each other in a circumferential direction of the cam ring and combining the shifted and non-shifted portions to form a basic cam groove surface and then combining the thus produced basic cam groove surface and the first basic cam groove surface. In the still another embodiment of the invention, the cam groove has a shape produced by shifting the first basic cam groove surface and the second basic cam groove surface relative to each other in a direction parallel to the optical axis and combining the shifted two basic cam groove surfaces so that the resultant groove width in the direction parallel to the optical axis is reduced. The cam groove and the cam follower can therefore be reduced in size in the optical axis direction, as in the one embodiment of the invention described above.

According to the embodiments of the invention, the cam groove and the cam follower can be reduced in size in the optical axis direction. A collapsible lens barrel can therefore be further reduced in size and thickness.

BRIEF DESCRIPTION OF THE DRAWINGS

FIG. 2 is a perspective view and a cross-sectional view showing a lens barrel in the digital still camera shown in FIG. 1 and shows a collapsed state in which the digital still camera is not in operation;

FIG. 3 is another perspective view and another cross-sectional view showing the lens barrel in the digital still camera shown in FIG. 1 and shows a protruding state in which the digital still camera is operated in a wide-angle imaging mode;

FIG. 4 is another perspective view and another cross-sectional view showing the lens barrel in the digital still camera shown in FIG. 1 and shows another protruding state in which the digital still camera is operated in a telescopic imaging mode;

FIG. 8 describes a concept for determining the shapes of the cam groove and the cam follower in the lens barrel for a digital still camera as a lens barrel according to an embodiment of the invention;

FIG. 9 is developments showing the shapes of a cam groove and a cam follower in an example (first embodiment) in the lens barrel for a digital still camera as a lens barrel according to an embodiment of the invention;

FIG. 10 is developments showing the shapes of a cam groove and a cam follower in another example (first referential example) associated with the first embodiment shown in FIG. 9;

FIG. 11 is developments showing the shapes of a cam groove and a cam follower in another example (second embodiment) in the lens barrel for a digital still camera as a lens barrel according to an embodiment of the invention;

FIG. 12 is developments showing the shapes of a cam groove and a cam follower in another example (second referential example) associated with the second embodiment shown in FIG. 11;

FIG. 13 is developments showing the shapes of a cam groove and a cam follower in another example (third embodiment) in the lens barrel for a digital still camera as a lens barrel according to an embodiment of the invention;

FIG. 14 is developments showing the shapes of a cam groove and a cam follower in another example (third referential example) associated with the third embodiment shown in FIG. 13;

FIG. 15 is developments showing the shapes of a cam groove and a cam follower in another example (fourth embodiment) in the lens barrel for a digital still camera as a lens barrel according to an embodiment of the invention;

FIG. 16 is developments showing the shapes of a cam groove and a cam follower in another example (fourth referential example) associated with the fourth embodiment shown in FIG. 15;

FIG. 17 is developments showing the shapes of a cam groove and a cam follower in another example (fifth embodiment) in the lens barrel for a digital still camera as a lens barrel according to an embodiment of the invention;

FIG. 18 is developments showing the shapes of a cam groove and a cam follower in another example (fifth referential example) associated with the fifth embodiment shown in FIG. 17; and FIG. 19 is developments showing the shapes of a cam groove and a cam follower in another example (sixth embodiment) in the lens barrel for a digital still camera as a lens barrel according to an embodiment of the invention.

DESCRIPTION OF THE PREFERRED EMBODIMENTS

Embodiments of the invention will be described below with reference to the drawings.

An imaging apparatus according to the following embodiments of the invention is a digital still camera 10. A lens barrel according to the following embodiments of the invention is a lens barrel 20 for the digital still camera 10.

The description will be made in the following order.

1. First embodiment (lens barrel: exemplary shapes of cam groove and cam follower)

2. Second embodiment (lens barrel: other exemplary shapes of cam groove and cam follower)

3. Third embodiment (lens barrel: other exemplary shapes of cam groove and cam follower)

4. Fourth embodiment (lens barrel: other exemplary shapes of cam groove and cam follower)

5. Fifth embodiment (lens barrel: other exemplary shapes of cam groove and cam follower)

6. Sixth embodiment (lens barrel: other exemplary shapes of cam groove and cam follower)

[Exemplary Exterior Appearance of Imaging Apparatus]

Figure 1:
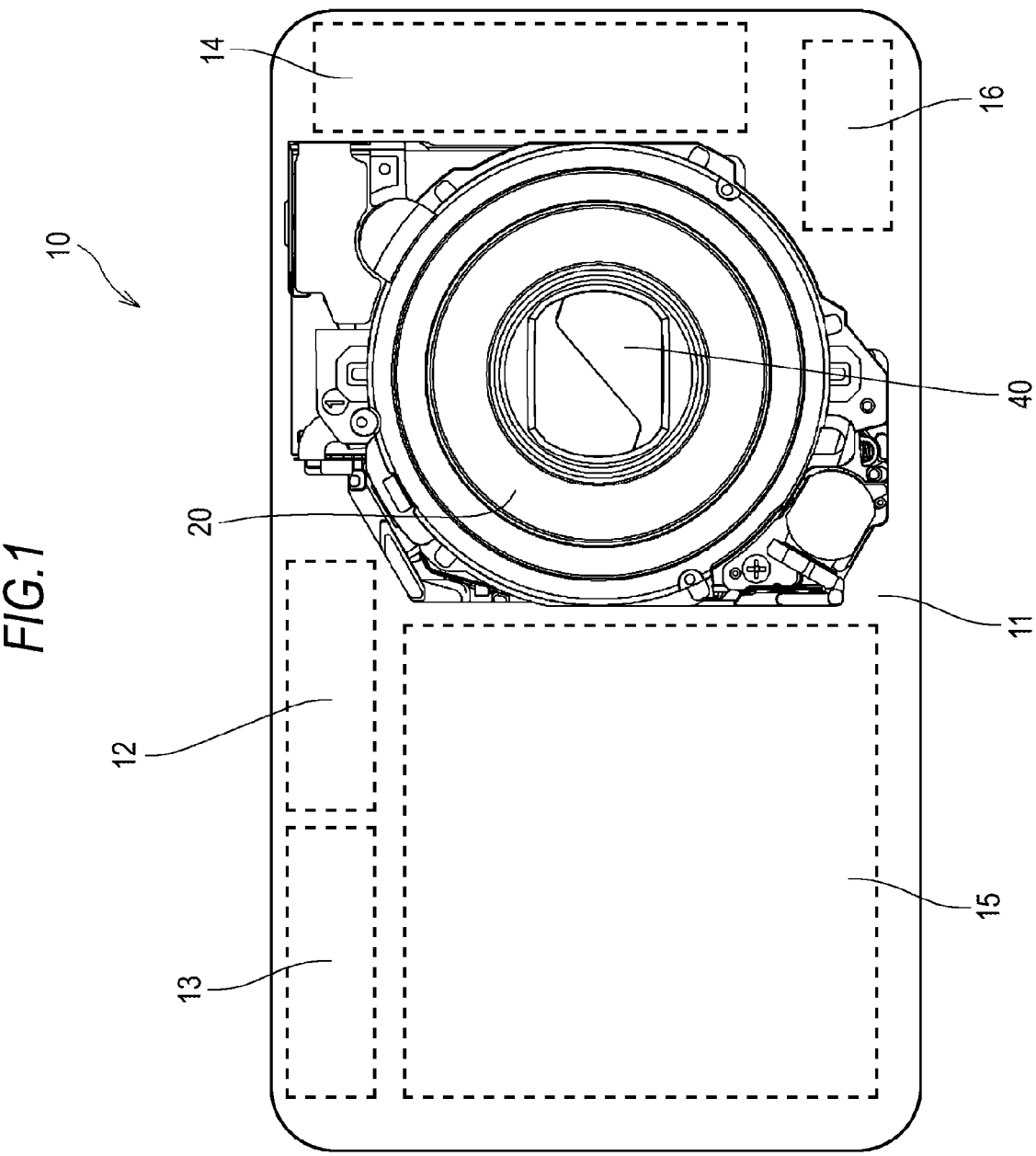
FIG. 1 is a front view showing the configuration of a digital still camera as an imaging apparatus according to an embodiment of the invention.

FIG. 1 is a front view showing the configuration of the digital still camera 10 as an imaging apparatus according to an embodiment of the invention.

As shown in FIG. 1, the digital still camera 10 includes a box-shaped body 11 that forms the exterior appearance. The lens barrel 20 is assembled into the body 11 in a right portion thereof. The front side of the lens barrel 20 is covered with a barrier unit 40 when the digital still camera 10 is not in operation, as shown in FIG. 1.

In the digital still camera 10 shown in FIG. 1, right and left directions are those recognized when the digital still camera 10 is viewed from the front, as shown in FIG. 1.

For example, a strobe light emitting unit 12 is built in the body 11 on the upper left side of the lens barrel 20, and a switch unit 13 is built in the body 11 on the left side of the strobe light emitting unit 12. Further, for example, an AF (Auto Focus) auxiliary light unit 14 is built in the body 11 on the right side of the lens barrel 20, and a battery 15 is built in the body 11 on the left side of the lens barrel 20. Still further, for example, a capacitor microphone 16 is built in the body 11 on the lower right side of the lens barrel 20.

[Exemplary Exterior Appearance of Lens Barrel]

FIG. 2 is a perspective view and a cross-sectional view showing the lens barrel 20 in the digital still camera 10 shown in FIG. 1. FIG. 2 shows a collapsed state in which the digital still camera 10 is not in operation.

FIG. 3 is another perspective view and another cross-sectional view showing the lens barrel 20 in the digital still camera 10 shown in FIG. 1. FIG. 3 shows a protruding state in which the digital still camera 10 is operated in a wide-angle imaging mode.

FIG. 4 is another perspective view and another cross-sectional view showing the lens barrel 20 in the digital still camera 10 shown in FIG. 1. FIG. 4 shows another protruding state in which the digital still camera 10 is operated in a telescopic imaging mode.

As shown in FIGS. 2 to 4, the lens barrel 20 is configured to be collapsible. An imaging optical system in the lens barrel 20 includes a first lens group 21 (corresponding to an imaging lens in the embodiment), a second lens group 22, an automatic exposure device 24, a third lens group 23, and an imaging device 25 arranged in this order from the subject side.

The imaging device 25 is a CCD image sensor, a CMOS image sensor, or any other suitable image sensor.

The second lens group 22 is movable in the direction perpendicular to an optical axis 20a to achieve a hand-shake prevention capability. The automatic exposure device 24, which is a light level adjuster having shuttering and iris capabilities, is held movably along the optical axis 20a and urged by a spring 26 in a direction away from the second lens group 22. When the digital still camera 10 is not in operation as shown in FIG. 2, part of the second lens group 22 is accommodated in an aperture of the automatic exposure device 24, whereas when the digital still camera 10 is in operation as shown in FIGS. 3 and 4, the second lens group 22 moves relative to the automatic exposure device 24 and away therefrom along the optical axis 20a due to the urging force of the spring 26. The second lens group 22 therefore comes out of the opening of the automatic exposure device 24.

When the digital still camera 10 is in operation as shown in FIGS. 3 and 4, the first lens group 21 is moved forward relative to the imaging device 25, which is fixed in the direction in which the optical axis 20a extends. A zooming action of the optical system is carried out by moving the second lens group 22 by a predetermined amount along the optical axis 20a. Further, a focusing action of the optical system is carried out by moving the third lens group 23 by a predetermined amount along the optical axis 20a. When the digital still camera 10 is not in operation as shown in FIG. 2, the front side of the first lens group 21 is protected with the barrier unit 40.

The movement of the first lens group 21 and the second lens group 22 in the optical axis direction is carried out by controlling a cam feeding mechanism and a drive motor (not shown).

[Exemplary Configuration of Lens Barrel]

Figure 5:
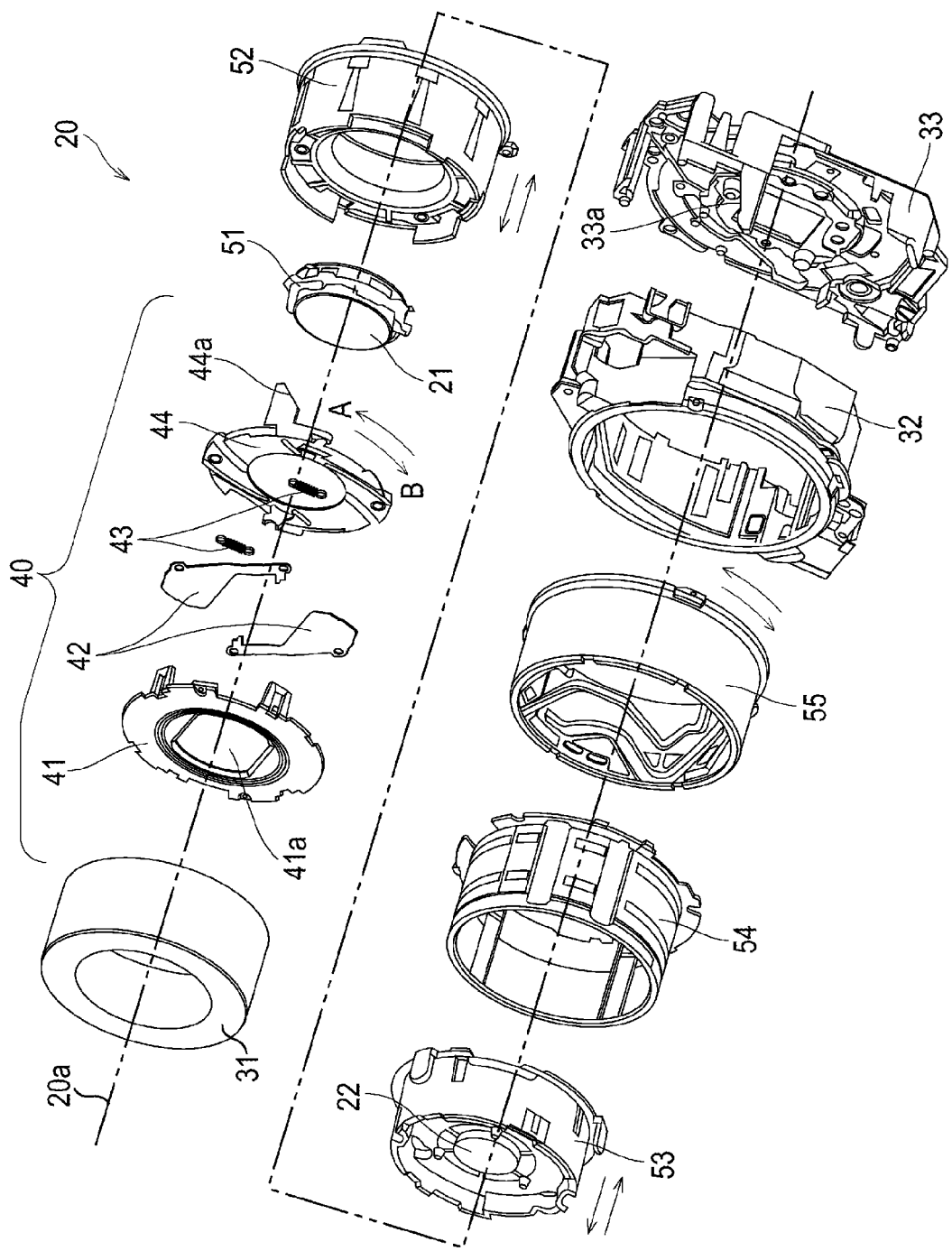
FIG. 5 is an exploded perspective view showing a key portion of the lens barrel for a digital still camera as a lens barrel according to an embodiment of the invention.

FIG. 5 is an exploded perspective view showing a key portion of the lens barrel 20 for a digital still camera as a lens barrel according to an embodiment of the invention.

As shown in FIG. 5, the lens barrel 20 includes a face ring 31, the barrier unit 40, a first lens frame 51 that holds the first lens group 21, a first movable frame 52 (corresponding to a holding frame in the embodiment) that moves the first lens frame 51, a second movable frame 53 that holds and moves the second lens group 22, a rectilinear guiding ring 54, a cam ring 55, a fixed ring 32, and a rear barrel 33 arranged in this order from the subject side.

In FIG. 5, the third lens group 23 and other component shown in FIGS. 2 to 4 are omitted for ease of illustration.

The face ring 31 is fixed to the first movable frame 52 to make the appearance of the lens barrel 20 clean and protects the barrier unit 40, which is formed of a barrier cover 41, barrier blades 42, barrier drive springs 43, and a barrier drive member 44. The face ring 31 is fixed by attaching a double-sided tape with a peel-off sheet onto the front surface of the barrier cover 41, which is fixed to the first movable frame 52, peeling the peel-off sheet off, and then placing the face ring 31 over the first movable frame 52. The adhesion of the double-sided tape allows the face ring 31 to be securely fixed to the first movable frame 52 with the barrier cover 41 therebetween.

The face ring 31 is preferably made of an aluminum alloy, stainless steel, or any other variety of metals, or an engineering plastic.

The barrier unit 40 closes an optical path that is an imaging aperture and protects the imaging optical system when the digital still camera 10 is not in operation. Specifically, the barrier cover 41 disposed in front of the first lens group 21 has an imaging aperture 41a that allows light to be incident on the first lens group 21 and other lens groups. The barrier drive springs 43, which are placed between the barrier cover 41 and the barrier blades 42, and the barrier drive member 44 form a mechanism for opening and closing the barrier blades 42.

In the thus configured barrier unit 40, the barrier drive member 44 opens and closes the barrier blades 42 when the position of the first lens frame 51 (first lens group 21) is switched between an imaging position and a retracting position. For example, when the first lens frame 51 is placed in the imaging position (see FIG. 2), the barrier drive member 44 rotates in the direction indicated by the arrow B, opens the barrier blades 42, unblocks the aperture 41a of the barrier cover 41, and allows light to be incident on the first lens group 21 and other lens groups. Conversely, when the first lens frame 51 is placed in the retracting position (see FIG. 2), the barrier drive member 44 rotates in the direction indicated by the arrow A, closes the barrier blades 42, blocks the aperture 41a of the barrier cover 41, and protects the first lens group 21.

The first lens group 21 is attached to the first lens frame 51, which is held by the first movable frame 52. The second lens group 22 is disposed downstream of the first lens group 21 in the direction in which the optical axis 20a extends and held by the second movable frame 53. Three cam followers are provided on each of the first movable frame 52 and the second movable frame 53. The three cam followers protrude outward from each of the movable frames and engage with three cam grooves provided on the inner circumferential side of the cam ring 55, which can rotate around the optical axis 20a. Further, the first movable frame 52 and the second movable frame 53 also engage with straight grooves in the rectilinear guiding ring 54 so that the first movable frame 52 and the second movable frame 53 do not rotate when the cam ring 55 rotates.

The cam ring 55 and the rectilinear guiding ring 54 engage with each other by means of bayonet fitting, and the rectilinear guiding ring 54 can move straight without any restriction when the cam ring 55 rotates. Further, when the cam ring 55 moves along the optical axis 20a, the rectilinear guiding ring 54 moves integrally with the cam ring 55. Specifically, the cam ring 55 has three cam pins, which fit into three cam grooves provided on the inner circumferential side of the fixed ring 32. When the cam ring 55 rotates relative to the fixed ring 32, the cam ring 55 follows the tracks of the cam grooves in the fixed ring 32 and moves along the optical axis 20a. Further, the rectilinear guiding ring 54 has five protrusions that allow the rectilinear guiding ring 54 to fit into the fixed ring 32, and the five protrusions fit into five straight grooves provided in the fixed ring 32. The rectilinear guiding ring 54 can therefore move relative to the fixed ring 32 only along the optical axis 20a but will not rotate.

Therefore, when the cam ring 55 is rotated, the cam ring 55 moves along the optical axis 20a while rotating relative to the fixed ring 32, and the rectilinear guiding ring 54 does not rotate but moves along the optical axis 20a integrally with the cam ring 55. Further, the first movable frame 52 and the second movable frame 53 do not rotate but moves along the optical axis 20a guided along the cam grooves in the cam ring 55. As a result, the first movable frame 52 makes reciprocating motion along the optical axis 20a when the cam ring 55 rotates and retracts or protrudes in accordance with the position of the cam ring 55. Further, the second movable frame 53 makes reciprocating motion along the optical axis 20a when the cam ring 55 rotates to perform zooming (wide-angle or telescopic imaging) in accordance with the position of the cam ring 55.

When the cam ring 55 is rotated in a certain direction, the first movable frame 52 first moves forward from the retracting position, and then the second movable frame 53 moves from the retracting position through the wide angle end position to the telescopic end position. Conversely, when the cam ring 55 is rotated in the opposite direction, the second movable frame 53 first retracts from the telescopic end position through the wide angle end position, and then the first movable frame 52 retracts from the protruding position.

The fixed ring 32 is held by the rear barrel 33, in which a cam surface 33a is formed. The cam surface 33a comes into contact with a cam surface 44a formed in the barrier drive member 44. When the first movable frame 52 moves and approaches the rear barrel 33, the cam surface 33a comes into contact with the cam surface 44a, causing the barrier drive springs 43 to be gradually charged and the barrier drive member 44 to rotate in the direction indicated by the arrow A. The barrier blades 42 are thus closed. Conversely, when the first movable frame 52 moves away from the rear barrel 33, the cam surface 33a separates from the cam surface 44a, causing the barrier drive springs 43 to be gradually discharged and the barrier drive member 44 to rotate in the direction indicated by the arrow B. The barrier blades 42 are thus opened.

As described above, when the cam ring 55 is rotated, the first movable frame 52 protrudes or retracts in accordance with the position of the cam ring 55 and the barrier blades 42 are opened or closed. Further, when the cam ring 55 is rotated, the second movable frame 53 moves toward the telescopic side or the wide-angle side in accordance with the position of the cam ring 55 and zooming is performed. To this end, a gear train is formed on the outer circumferential surface of the cam ring 55, and a drive motor (not shown) fixed between the fixed ring 32 and the rear barrel 33 drives and rotates the cam ring 55.

The rotational drive force generated by the drive motor is transferred by a cam ring drive unit that rotates the cam ring 55 via a plurality of reduction gears.

[Exemplary Configuration of Cam Ring Drive Unit in Lens Barrel]

Figure 6:
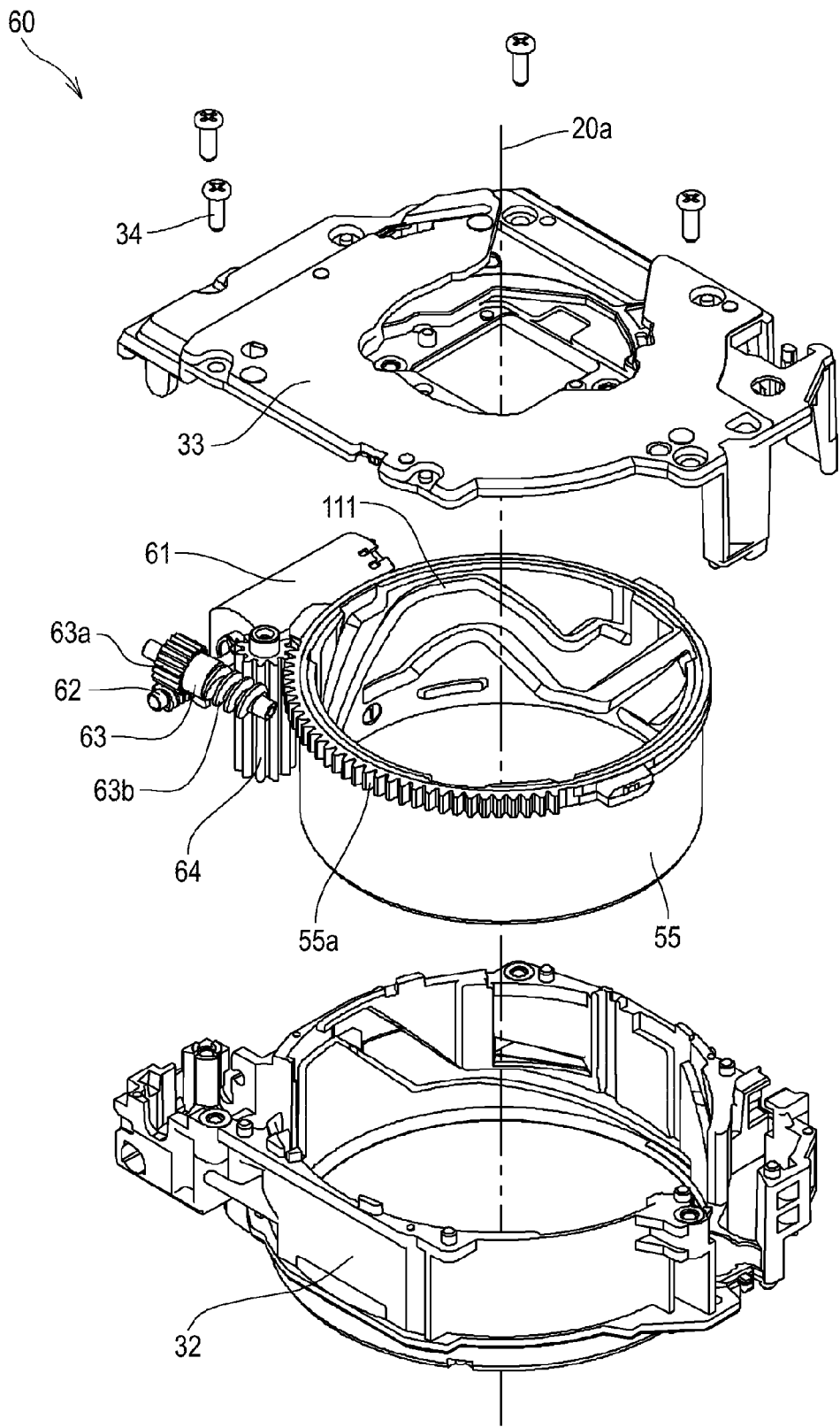
FIG. 6 is an exploded perspective view showing a cam ring drive unit in the lens barrel for a digital still camera as a lens barrel according to an embodiment of the invention.

FIG. 6 is an exploded perspective view showing a cam ring drive unit 60 in the lens barrel 20 for a digital still camera as a lens barrel according to an embodiment of the invention.

As shown in FIG. 6, the cam ring drive unit 60 includes a drive motor 61, a first worm gear 62, a two-stage gear 63, and a final spur gear 64. The drive motor 61, the two-stage gear 63, and the final spur gear 64 are supported in a space between the fixed ring 32 and the rear barrel 33. The fixed ring 32 and the rear barrel 33 are fixed with four fastening screws 34.

The first worm gear 62 is fixed to a rotational output shaft of the drive motor 61 in a press fitting process, whereby the first worm gear 62 rotates integrally with the rotational output shaft. The two-stage gear 63 is formed of an intermediate spur gear 63a on the input side and a second worm gear 63b on the output side. The first worm gear 62 engages with the intermediate spur gear 63a of the two-stage gear 63. Further, the second worm gear 63b of the two-stage gear 63 engages with the final spur gear 64. The final spur gear 64 engages with a spur gear train 55a formed on part of the outer circumferential surface of the cam ring 55.

The spur gear train 55a may be formed all around the cam ring 55.

The drive motor 61, when driven and rotated, therefore rotates the cam ring 55 around the optical axis 20a via the two worm gears (first worm gear 62 and second worm gear 63b), which provide a high reduction ratio. As a result, cam grooves 111 provided on the inner circumferential side of the cam ring 55 rotate, and the cam followers (not shown) that engage with the cam grooves 111 move therealong. The first movable frame 52 and the second movable frame 53 (see FIG. 5), on which the cam followers are provided, therefore make reciprocating motion along the optical axis 20a.

The first worm gear 62 has a light-blocking blade (not shown) for detecting the rotational position of the cam ring 55. Specifically, when the drive motor 61 is driven, the drive motor 61 rotates the light-blocking blade, which moves forward or backward through the space between a light emitting portion and a light receiving portion of a photo-interrupter (not shown) held by the fixed ring 32. As a result, an electric signal pulse is generated whenever the state is switched between light blockage and light transmission. The rotational position of the cam ring 55 is detected by counting the electric signal pulses in consideration of the rotational direction instructed by control means.

As described above, the first movable frame 52 and the second movable frame 53 (see FIG. 5) make reciprocating motion along the optical axis 20a when the cam ring 55 is rotated because the cam followers (not shown) engage with the cam grooves 111. Zooming is performed in accordance with the rotational position of the cam ring 55, and the first movable frame 52 and the second movable frame 53 move backward from the imaging position to the retracting position when the digital still cameras 10 is not in operation.

The cam grooves and the cam followers will now be described.

Figure 7:
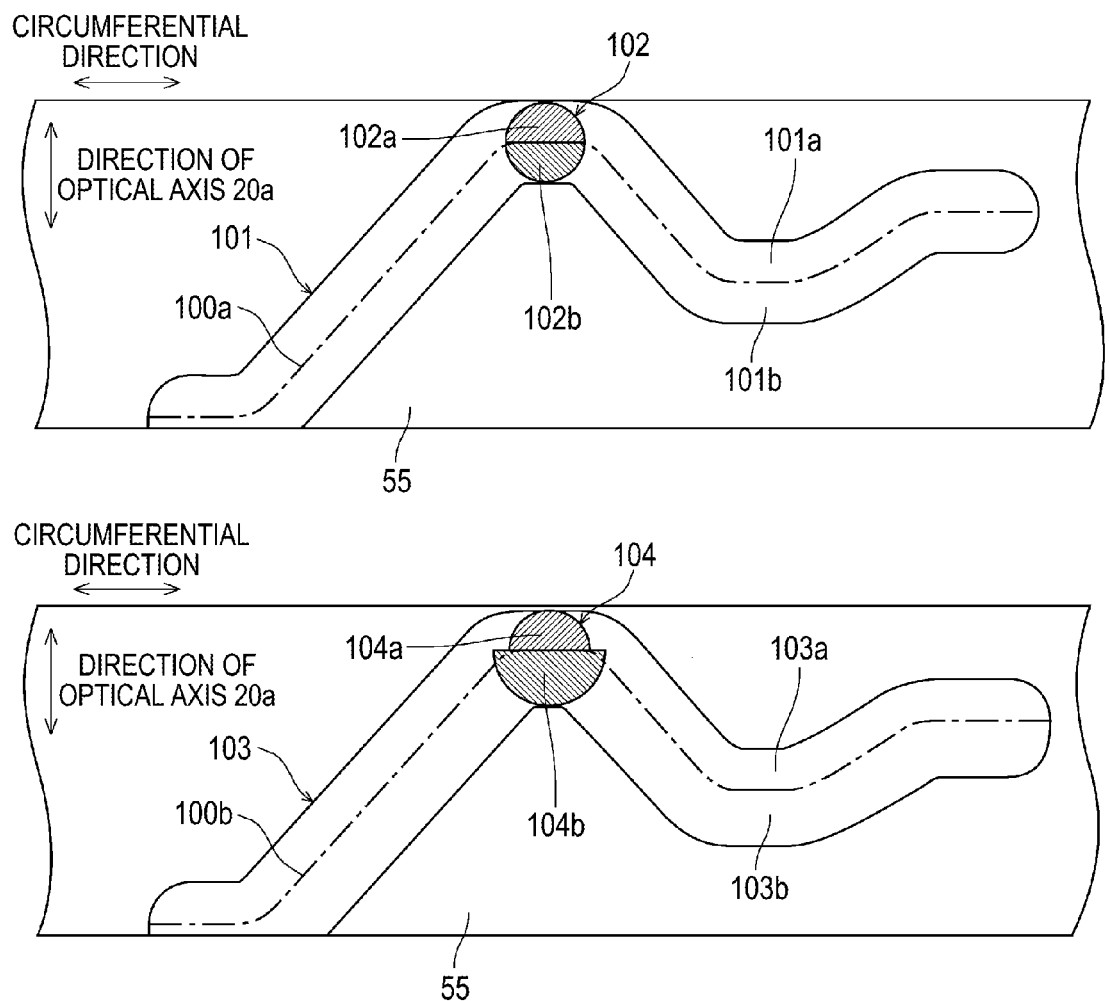
FIG. 7 is developments showing basic cam grooves and basic cam followers based on which the shapes of a cam groove and a cam follower are determined in the lens barrel for a digital still camera as a lens barrel according to an embodiment of the invention.

FIG. 7 is developments showing basic cam grooves 101 and 103 and basic cam followers 102 and 104 based on which the shapes of the cam grooves and the cam followers are determined in the lens barrel 20 for a digital still camera as a lens barrel according to an embodiment of the invention.

In the basic cam groove 101 shown in the upper part of FIG. 7, the groove surface on one side along a basic track 100a of the shape of the basic cam groove 101 is defined as a first basic cam groove surface 101a, and the groove surface on the other side is defined as a second basic cam groove surface 101b. Further, the shape determined by combining a first portion 102a that engages with the first basic cam groove surface 101a and a second portion 102b that engages with the second basic cam groove surface 101b is defined as the shape of the basic cam follower 102.

The first basic cam groove surface 101a and the second basic cam groove surface 101b are symmetric in the cross section taken along the direction perpendicular to the basic track 100a. In this case, the first basic cam groove surface 101a and the second basic cam groove surface 101b have the same groove width, and the first portion 102a and the second portion 102b has the same radius. The basic cam follower 102 therefore has a circular shape in the corresponding development shown in FIG. 7.

In the basic cam groove 103 shown in the lower part of FIG. 7, the groove surface on one side along a basic track 100b of the shape of the basic cam groove 103 is defined as a first basic cam groove surface 103a, and the groove surface on the other side is defined as a second basic cam groove surface 103b. Further, the shape determined by combining a first portion 104a that engages with the first basic cam groove surface 103a and a second portion 104b that engages with the second basic cam groove surface 103b is defined as the shape of the basic cam follower 104.

In the basic cam groove 103 shown in the lower part of FIG. 7, the first basic cam groove surface 103a and the second basic cam groove surface 103b are asymmetric in the cross section taken along the direction perpendicular to the basic track 100b, and the groove width of the first basic cam groove surface 103a is narrower than the groove width of the second basic cam groove surface 103b. The shape of the basic cam follower 104 is therefore the combination of the smaller first portion 104a and the larger second portion 104b.

FIG. 8 describes a concept based on which the shapes of the cam grooves and the cam followers are determined in the lens barrel 20 for a digital still camera as a lens barrel according to an embodiment of the invention.

As shown in the upper part of FIG. 8, let θ1 be a maximum lead angle of the basic track 100a. In this case, the first portion 102a of the basic cam follower 102 has a region A that engages with the basic cam groove 101 and a region B that does not engage with the basic cam groove 101. The non-engaging region B is not involved in the engagement between the basic cam groove 101 and the basic cam follower 102.

The cam width can therefore be reduced by the amount corresponding to the non-engaging region B by removing the region B from the first portion 102a (see upper right part of FIG. 8). The decrease in the cam width of the first portion 102a allows the groove width of the first basic cam groove surface 101a to be reduced.

Although not shown, the cam width of the second portion 102b and the groove width of the second basic cam groove surface 101b can be similarly reduced.

The central part of FIG. 8 is cross-sectional views showing cam groove shapes A and B different from each other. The cam groove shape A is symmetric with respect to a normal with an angle θ2 on both sides. The cam groove shape B is asymmetric with respect to a normal with an angle θ2 on one side and an angle θ3 on the other side (the side closer to imaging device 25). In the embodiment of the invention, the cross-sectional shape of the cam groove may be the cam groove shape A or the cam groove shape B. It is noted that when the angle θ3 on the side closer to the imaging device 25 is small, as in the cam groove shape B, the cam follower (not shown) unlikely disengages from the cam groove when the lens barrel 20 (see FIG. 5) falls.

Further, consider a cam groove produced by combining a basic cam groove surface formed by shifting the two inclined portions of the first basic cam groove surfaces 101a relative to each other in the circumferential direction (right-left direction in FIG. 8) of the cam ring 55 (see FIG. 6) and combining the shifted and non-shifted portions and a basic cam groove surface formed by shifting the two inclined portions of the second basic cam groove surfaces 101b relative to each other in the circumferential direction of the cam ring 55 and combining the shifted and non-shifted portions, as shown in the lower part of FIG. 8. In this case, the cam width W2 (horizontal width in FIG. 8) can be greater than that of the basic cam follower 102 in correspondence with the shift of the first basic cam groove surface 101a and the second basic cam groove surface 101b.

Therefore, the cross-sectional area (mechanical strength) of the basic cam follower 102 increases without change in the cam width W1 (vertical width in FIG. 8) in the direction in which the optical axis 20a extends. Conversely, when the cross-sectional area (mechanical strength) is to remain unchanged, the shape of the cam follower can be narrowed along the optical axis 20a by the amount corresponding to the increase in the circumferential direction (increase in cross-sectional area). In this case, the decrease in the size along the optical axis 20a allows the groove width of the basic cam groove 101 to be reduced.

In the cam groove produced by combining the basic cam groove surface formed by shifting the two inclined portions of the first basic cam groove surfaces 101a relative to each other in the circumferential direction and combining the shifted and non-shifted portions and the basic cam groove surface formed by shifting the two inclined portions of the second basic cam groove surfaces 101b relative to each other in the circumferential direction and combining the shifted and non-shifted portions, the inner side of a curved portion may form an acute angle depending on the shape of the basic track 100a.

As described above, according to the concept shown in the upper part of FIG. 8, the groove width of the basic cam groove 101 can be reduced in the direction parallel to the optical axis 20a by shifting the first basic cam groove surface 101a and the second basic cam groove surface 101b relative to each other in the direction described above. Further, the cam width of the basic cam follower 102 can be reduced in the direction parallel to the optical axis 20a in correspondence with the relative shift of the first basic cam groove surface 101a and the second basic cam groove surface 101b. Moreover, according to the concept shown in the lower part of FIG. 8, using the cam groove produced by combining the basic cam groove surface formed by shifting the two inclined portions of the first basic cam groove surfaces 101a relative to each other in the circumferential direction and combining the shifted and non-shifted portions and the basic cam groove surface formed by shifting the two inclined portions of the second basic cam groove surfaces 101b relative to each other in the circumferential direction and combining the shifted and non-shifted portions allows the groove width in the shifting direction to be increased. Further, the cam width of the basic cam follower 102 in the circumferential direction can be increased in correspondence with the increase in the cam groove width in the shifting direction.

A description will next be made of the shapes of a cam groove and a cam follower determined based on the concepts shown in FIG. 8.

<1. First Embodiment>
[Exemplary Shapes of Cam Groove and Cam Follower in Lens Barrel]

FIG. 9 is developments showing the shapes of the cam groove 111 and a cam follower 112 in an example (first embodiment) in the lens barrel 20 for a digital still camera as a lens barrel according to an embodiment of the invention.

In the first embodiment shown in FIG. 9, the first basic cam groove surface 101a and the second basic cam groove surface 101b of the basic cam groove 101, based on which the shape of the cam groove 111 is determined, are symmetric in the cross section taken along the direction perpendicular to the basic track 100a. The basic cam follower 102 determined by combining the first portion 102a, which engages with the first basic cam groove surface 101a, and the second portion 102b, which engages with the second basic cam groove surface 101b, therefore has a circular shape in the corresponding development shown in FIG. 9.

The cam groove 111 in the first embodiment is formed by changing the shape of the basic cam groove 101 in such a way that the first basic cam groove surface 101a is shifted in a direction parallel to the optical axis 20a (downward in FIG. 9)

and the second basic cam groove surface 101b is shifted in the opposite direction parallel to the optical axis 20a (upward in FIG. 9). The groove width is thus reduced in the direction parallel to the optical axis 20a.

Further, the cam follower 112 in the first embodiment is formed by changing the shape of the basic cam follower 102 in such a way that the cam width in the direction parallel to the optical axis 20a is reduced (the portion of the first portion 102a that faces the basic track 100a is removed) in correspondence with the shift of the first basic cam groove surface 101a. The cam width in the direction parallel to the optical axis 20a is further reduced (the portion of the second portion 102b that faces the basic track 100a is removed) in correspondence with the shift of the second basic cam groove surface 101b.

Since the groove width of the cam groove 111 and the cam width W1 of the cam follower 112 are reduced in the direction in which the optical axis 20a extends, the length of the cam ring 55 (see FIG. 5) can be shortened. As a result, the size and the thickness of the lens barrel 20 (see FIG. 5) and hence the size (thickness) of the digital still camera 10 (see FIG. 1) can be reduced.

The cam follower 112 engages with the cam groove 111 without any problem even when the cam width W1 decreases, because the portion having been removed is the region of the cam follower 112 that does not engage with the cam groove 111. Further, the decrease in the length of the cam ring 55 does not affect the travels of the first movable frame 52 (first lens group 21) and the second movable frame 53 (second lens group 22) shown in FIG. 5. Moreover, the cam follower 112 does not have any mechanical strength problem because the cam width W2 in the circumferential direction is substantially the same as the width of the basic cam follower 102.

FIG. 10 is developments showing the shapes of a cam groove 211 and a cam follower 212 in another example (first referential example) associated with the first embodiment shown in FIG. 9.

The cam groove 211 and the cam follower 212 shown in FIG. 10 are presented by way of referential example but will be described because they can be an example of the invention depending on the maximum lead angle θ1 (see FIG. 8) of the basic track 100b.

In the first referential example shown in FIG. 10, the first basic cam groove surface 103a and the second basic cam groove surface 103b of the basic cam groove 103, based on which the shape of the cam groove 211 is determined, are asymmetric in the cross section taken along the direction perpendicular to the basic track 100b. The shape of the basic cam follower 104 is therefore the combination of the small first portion 104a, which engages with the first basic cam groove surface 103a, and the large second portion 104b, which engages with the second basic cam groove surface 103b.

The first basic cam groove surface 103a of the basic cam groove 103 is shifted in a direction parallel to the optical axis 20a (downward in FIG. 10), as in the cam groove 111 (see FIG. 9) in the first embodiment. The second basic cam groove surface 103b is shifted in the opposite direction (upward in FIG. 10) parallel to the optical axis 20a. The groove width is thus reduced in the direction parallel to the optical axis 20a.

Further, the cam width of the basic cam follower 104 in the direction parallel to the optical axis 20a is reduced (the portion of the first portion 104a that faces the basic track 100b is removed) in correspondence with the shift of the first basic cam groove surface 103a, as in the cam follower 112 in the first embodiment (see FIG. 9). The cam width in the direction parallel to the optical axis 20a is further reduced (the portion of the second portion 104b that faces the basic track 100b is removed) in correspondence with the shift of the second basic cam groove surface 103b.

In the cam groove 211 and the cam follower 212 in the first referential example, since the cam width W1 is also reduced in the direction in which the optical axis 20a extends, the length of the cam ring 55 (see FIG. 5) can be shortened. The cam follower 212 is, however, presented as the first referential example associated with the first embodiment shown in FIG. 9 because the cam follower 212 interferes with the cam groove 211 in the inclined portions of the basic path 100b.

The cam groove 211 interferes with the cam follower 212 in the first referential example because the maximum lead angle θ1 (see FIG. 8) is the same as that in the first embodiment in consideration of ease of illustration. The interference will therefore not occur when the maximum lead angle θ1 is set appropriately.

<2. Second Embodiment>

[Other Exemplary Shapes of Cam Groove and Cam Follower in Lens Barrel]

FIG. 11 is developments showing the shapes of a cam groove 121 and a cam follower 122 in another example (second embodiment) in the lens barrel 20 for a digital still camera as a lens barrel according to an embodiment of the invention.

In the second embodiment shown in FIG. 11, the first basic cam groove surface 103a and the second basic cam groove surface 103b of the basic cam groove 103, based on which the shape of the cam groove 121 is determined, are asymmetric in the cross section taken along the direction perpendicular to the basic track 100b. The shape of the basic cam follower 104 is therefore the combination of the large first portion 104a, which engages with the first basic cam groove surface 103a, and the small second portion 104b, which engages with the second basic cam groove surface 103b.

The cam groove 121 in the second embodiment is formed by changing the shape of the basic cam groove 103 in such a way that the two inclined portions of the second basic cam groove surfaces 103b are shifted relative to each other in the circumferential direction (right-left direction in FIG. 11) so that the groove width in the circumferential direction is increased. In other words, the two inclined portions of the second basic cam groove surfaces 103b are shifted relative to each other in the right and left directions in FIG. 11 respectively so that the groove width in the circumferential direction is increased.

Further, the cam follower 122 in the second embodiment is formed by shifting the basic cam follower 104 in such a way that the cam width in the circumferential direction (right-left direction in FIG. 11) is increased in correspondence with the relative shift of the two inclined portions of the second basic cam groove surfaces 103b. The apexes of the curved portions of the second portions 104b having been shifted are connected by a straight line to form the shape of the cam follower 122.

Since the cam width W2 of the cam follower 122 is increased in the circumferential direction without change in the cam width in the direction parallel to the optical axis 20a, the cross-sectional area (mechanical strength) can be increased. The size of the cam follower 122 can therefore be reduced in the direction in which the optical axis 20a extends by the amount corresponding to the increase in cross-sectional area (mechanical strength), and the groove width of the cam groove 121 can be reduced accordingly. As a result, the length of the cam ring 55 (see FIG. 5) can be shortened, whereby the size (thickness) of the lens barrel 20 (see FIG. 5) and the digital still camera 10 (see FIG. 1) can be reduced.

It is noted that the decrease in the length of the cam ring 55 does not cause any problem with the engagement between the cam groove 121 and the cam follower 122 in the second embodiment or affect the travels of the first movable frame 52 (first lens group 21) and the second movable frame 53 (second lens group 22) shown in FIG. 5.

FIG. 12 is developments showing the shapes of a cam groove 221 and a cam follower 222 in another example (second referential example) associated with the second embodiment shown in FIG. 11.

The cam groove 221 and the cam follower 222 shown in FIG. 12 are presented by way of referential example but will be described because they can be an example of the invention depending on the maximum lead angle θ1 (see FIG. 8) of the basic track 100a.

In the second referential example shown in FIG. 12, the first basic cam groove surface 101a and the second basic cam groove surface 101b of the basic cam groove 101, based on which the shape of the cam groove 221 is determined, are symmetric in the cross section taken along the direction perpendicular to the basic track 100a. The basic cam follower 102 determined by combining the first portion 102a, which engages with the first basic cam groove surface 101a, and the second portion 102b, which engages with the second basic cam groove surface 101b, therefore has a circular shape in the corresponding development shown in FIG. 12.

As in the cam groove 121 (see FIG. 11) in the second embodiment, the shape of the basic cam groove 101 is changed by shifting the two inclined portions of the second basic cam groove surfaces 101b relative to each other in the circumferential direction (right-left direction in FIG. 12) so that the groove width in the circumferential direction is increased. In other words, the two inclined portions of the second basic cam groove surfaces 101b are shifted relative to each other in the right and left directions in FIG. 12 respectively so that the groove width in the circumferential direction is increased.

Further, the basic cam follower 102 is shifted in such a way that the cam width thereof is increased in the circumferential direction (right-left direction in FIG. 12) in correspondence with the relative shift of the two inclined portions of the second basic cam groove surfaces 101b, as in the cam follower 122 (see FIG. 11) in the second embodiment. The apexes of the curved portions of the second portions 102b having been shifted are connected by a straight line to form the shape of the cam follower 222.

Since the cam width W2 of the cam follower 222 in the second referential example is also increased in the circumferential direction without change in the cam width in the direction parallel to the optical axis 20a, the cross-sectional area (mechanical strength) can be increased. The size of the cam follower 222 can therefore be reduced in the direction in which the optical axis 20a extends by the amount corresponding to the increase in cross-sectional area (mechanical strength). As a result, the groove width of the cam groove 221 can be reduced, and the length of the cam ring 55 (see FIG. 5) can be shortened accordingly. The cam follower 222 is, however, presented as the second referential example associated with the second embodiment shown in FIG. 11 because the cam follower 222 interferes with the cam groove 221 in the inclined portions of the basic track 100a.

The cam groove 221 interferes with the cam follower 222 in the second referential example because the maximum lead angle θ1 (see FIG. 8) is the same as that in the second embodiment in consideration of ease of illustration. The interference will therefore not occur when the maximum lead angle θ1 is set appropriately.

<3. Third Embodiment>
[Other Exemplary Shapes of Cam Groove and Cam Follower in Lens Barrel]

FIG. 13 is developments showing the shapes of a cam groove 131 and a cam follower 132 in another example (third embodiment) in the lens barrel 20 for a digital still camera as a lens barrel according to an embodiment of the invention.

In the cam groove 131 in the third embodiment shown in FIG. 13, the two inclined portions of the first basic cam groove surfaces 103a are shifted relative to each other in the circumferential direction, unlike the two inclined portions of the second basic cam groove surfaces 103b are shifted relative to each other in the circumferential direction in the cam groove 121 in the second embodiment shown in FIG. 11.

The cam groove 131 and the cam follower 132 shown in FIG. 13 are therefore produced by reversing the cam groove 121 and the cam follower 122 shown in FIG. 11 with respect to the basic track 100b. The cam groove 131 and the cam follower 132 in the third embodiment therefore also allow the length of the cam ring 55 (see FIG. 5) to be shortened and the size (thickness) of the lens barrel 20 (see FIG. 5) and the digital still camera 10 (see FIG. 1) can be reduced accordingly, as in the cam groove 121 and the cam follower 122 in the second embodiment.

FIG. 14 is developments showing the shapes of a cam groove 231 and a cam follower 232 in another example (third referential example) associated with the third embodiment shown in FIG. 13.

The cam groove 231 and the cam follower 232 shown in FIG. 14 are presented by way of referential example but will be described because they can be an example of the invention depending on the maximum lead angle θ1 (see FIG. 8) of the basic track 100a.

In the cam groove 231 in the third referential example shown in FIG. 14, the two inclined portions of the first basic cam groove surfaces 101a are shifted relative to each other in the circumferential direction, unlike the two inclined portions of the second basic cam groove surfaces 101b are shifted relative to each other in the circumferential direction in the cam groove 221 in the second referential example shown in FIG. 12. The cam groove 231 and the cam follower 232 in the third referential example are therefore produced by reversing the cam groove 221 and the cam follower 222 shown in the second referential example with respect to the basic track 100a.

The cam groove 231 and the cam follower 232 shown in FIG. 14 therefore also allow the length of the cam ring 55 (see FIG. 5) to be shortened, as in the cam groove 221 and the cam follower 222 shown in FIG. 12. The cam follower 232 is, however, presented as the third referential example associated with the third embodiment shown in FIG. 13 because the cam follower 232 interferes with the cam groove 231 in the inclined portions of the basic track 100a.

The interference between the cam groove 231 and the cam follower 232 will not occur when the maximum lead angle θ1 (see FIG. 8) is set appropriately in the third referential example as well.

<4. Fourth Embodiment>
[Other Exemplary Shapes of Cam Groove and Cam Follower in Lens Barrel]

FIG. 15 is developments showing the shapes of a cam groove 141 and a cam follower 142 in another example (fourth embodiment) in the lens barrel 20 for a digital still camera as a lens barrel according to an embodiment of the invention.

The cam groove 141 in the fourth embodiment shown in the lower part of FIG. 15 is formed by changing the cam groove 121 in the second embodiment shown in the middle part of FIG. 15 (lower part of FIG. 11) in such a way that the first basic cam groove surface 101a is further shifted in a direction parallel to the optical axis 20a (downward in FIG. 15). The second basic cam groove surface 101b is shifted in the opposite direction parallel to the optical axis 20a (upward in FIG. 15). The groove width is thus reduced in the direction parallel to the optical axis 20a.

Similarly, the cam follower 142 in the fourth embodiment shown in the lower part of FIG. 15 is formed by changing the cam follower 122 in the second embodiment shown in the middle part of FIG. 15 (lower part in FIG. 11) in such a way that the cam width in a direction parallel to the optical axis 20a (downward in FIG. 15) is reduced in correspondence with the shift of the first basic cam groove surface 101a. The cam width in the opposite direction parallel to the optical axis 20a (upward in FIG. 15) is further reduced in correspondence with the shift of the second basic cam groove surface 101b.

Since the groove width of the cam groove 141 and the cam width W1 of the cam follower 142 are reduced in the direction in which the optical axis 20a extends, the length of the cam ring 55 (see FIG. 5) can be shortened. As a result, the size (thickness) of the lens barrel 20 (see FIG. 5) and the digital still camera 10 (see FIG. 1) can be reduced.

The cam follower 142 engages with the cam groove 141 without any problem even when the cam width W1 decreases, because the portion having been removed is the region of the cam follower 142 that does not engage with the cam groove 141. Further, the decrease in the length of the cam ring 55 does not affect the travels of the first movable frame 52 (first lens group 21) and the second movable frame 53 (second lens group 22) shown in FIG. 5. Moreover, the cam follower 142 does not have any mechanical strength problem because the cam width W2 in the circumferential direction is substantially the same as the width of the cam follower 122.

FIG. 16 is developments showing the shapes of a cam groove 241 and a cam follower 242 in another example (fourth referential example) associated with the fourth embodiment shown in FIG. 15.

The cam groove 241 and the cam follower 242 shown in FIG. 16 are presented by way of referential example but will be described because they can be an example of the invention depending on the maximum lead angle θ1 (see FIG. 8) of the basic track 100a.

The cam groove 241 in the fourth referential example shown in the lower part of FIG. 16 is formed by changing the cam groove 221 in the second referential example shown in the middle part of FIG. 16 (lower part of FIG. 12) in such a way that the first basic cam groove surface 101a is further shifted in a direction parallel to the optical axis 20a (downward in FIG. 16). The second basic cam groove surface 101b is shifted in the opposite direction (upward in FIG. 16) parallel to the optical axis 20a. The groove width is thus reduced in the direction parallel to the optical axis 20a.

Similarly, the cam follower 242 in the fourth referential example shown in the lower part of FIG. 16 is formed by changing the cam follower 222 in the second referential example shown in the middle part of FIG. 16 (lower part of FIG. 12) in such a way that the cam width in the direction parallel to the optical axis 20a is reduced in correspondence with the shift of the first basic cam groove surface 101a. The cam width in the direction parallel to the optical axis 20a is further reduced in correspondence with the shift of the second basic cam groove surface 101b.

The relationship between the fourth referential example and the second referential example is the same as the relationship between the fourth embodiment and the second embodiment, and the length of the cam ring 55 (see FIG. 5) can be shortened. The cam follower 242 is, however, presented as the fourth referential example associated with the fourth embodiment shown in FIG. 15 because the cam follower 242 interferes with the cam groove 241 in the inclined portions of the basic track 100a.

The interference between the cam groove 241 and the cam follower 242 will not occur when the maximum lead angle θ1 (see FIG. 8) is set appropriately in the fourth referential example as well.

<5. Fifth Embodiment>
[Other Exemplary Shapes of Cam Groove and Cam Follower in Lens Barrel]

FIG. 17 is developments showing the shapes of a cam groove 151 and a cam follower 152 in another example (fifth embodiment) in the lens barrel 20 for a digital still camera as a lens barrel according to an embodiment of the invention.

The cam groove 151 in the fifth embodiment shown in the lower part of FIG. 17 is based on the cam groove 131 in the third embodiment shown in the middle part of FIG. 17 (lower part of FIG. 13), as in the case where the cam groove 141 in the fourth embodiment shown in FIG. 15 is based on the cam groove 121 in the second embodiment shown in FIG. 11.

The cam groove 151 and the cam follower 152 shown in FIG. 17 are therefore produced by reversing the cam groove 141 and the cam follower 142 shown in FIG. 15 with respect to the basic track 100b. The cam groove 151 and the cam follower 152 in the fifth embodiment therefore also allow the length of the cam ring 55 (see FIG. 5) to be shortened and the size (thickness) of the lens barrel 20 (see FIG. 5) and the digital still camera 10 (see FIG. 1) can be reduced, as in the cam groove 141 and the cam follower 142 in the fourth embodiment.

FIG. 18 is developments showing the shapes of a cam groove 251 and a cam follower 252 in another example (fifth referential example) associated with the fifth embodiment shown in FIG. 17.

The cam groove 251 and the cam follower 252 shown in FIG. 18 are presented by way of referential example but will be described because they can be an example of the invention depending on the maximum lead angle θ1 (see FIG. 8) of the basic track 100a.

The cam groove 251 in the fifth referential example shown in the lower part of FIG. 18 is based on the cam groove 231 in the third referential example shown in the middle part of FIG. 18 (lower part of FIG. 14), as in the case where the cam groove 241 in the fourth referential example shown in FIG. 16 is based on the cam groove 221 in the second referential example shown in FIG. 12.

The cam groove 251 and the cam follower 252 shown in FIG. 18 are therefore produced by reversing the cam groove 241 and the cam follower 242 shown in FIG. 16 with respect to the basic track 100a. The cam groove 251 and the cam follower 252 in the fifth referential example therefore also allow the length of the cam ring 55 (see FIG. 5) to be shortened, as in the cam groove 241 and the cam follower 242 in the fourth referential example. The cam follower 252 is, however, presented as the fifth referential example associated with the fifth embodiment shown in FIG. 17 because the cam follower 252 interferes with the cam groove 251 in the inclined portions of the basic track 100a.

The interference between the cam groove 251 and the cam follower 252 will not occur when the maximum lead angle θ1 (see FIG. 8) is set appropriately in the fifth referential example as well.

<6. Sixth Embodiment>
[Other Exemplary Shapes of Cam Groove and Cam Follower in Lens Barrel]

FIG. 19 is developments showing the shapes of a cam groove 161 and a cam follower 162 in another example (sixth embodiment) in the lens barrel 20 for a digital still camera as a lens barrel according to an embodiment of the invention.

In the sixth embodiment shown in FIG. 19, the first basic cam groove surface 101a and the second basic cam groove surface 101b of the basic cam groove 101, based on which the shape of the cam groove 161 is determined, are symmetric in the cross section taken along the direction perpendicular to the basic track 100a. The basic cam follower 102 determined by combining the first portion 102a, which engages with the first basic cam groove surface 101a, and the second portion 102b, which engages with the second basic cam groove surface 101b, therefore has a circular shape in the corresponding development shown in FIG. 19.

The cam groove 161 in the sixth embodiment is formed by changing the shape of the basic cam groove 101 in such a way that not only the two inclined portions of the first basic cam groove surfaces 101a but also the two inclined portions of the second basic cam groove surfaces 101b are shifted relative to each other in the circumferential direction (right-left direction in FIG. 19) so that the groove width in the circumferential direction is increased. In other words, not only the two inclined portions of the first basic cam groove surfaces 101a but also the two inclined portions of the second basic cam groove surfaces 101b are shifted relative to each other in the right and left directions in FIG. 19 respectively so that the groove width in the circumferential direction is increased (see the middle part of FIG. 19).

Further, the cam follower 162 in the sixth embodiment is formed by shifting the basic cam follower 102 in such a way that the cam width in the circumferential direction (right-left direction in FIG. 19) is increased in correspondence with the relative shift of the two inclined portions of the first basic cam groove surfaces 101a and the two inclined portions of the second basic cam groove surfaces 101b. The apexes of the curved portions of the first portions 102a and the second portions 102b having been shifted are connected by straight lines to form the shape of the cam follower 162 (see the middle part of FIG. 19).

Moreover, in the cam groove 161 in the sixth embodiment, the first basic cam groove surface 101a is shifted in a direction parallel to the optical axis 20a (downward in FIG. 19), and the second basic cam groove surface 101b is shifted in the opposite direction parallel to the optical axis 20a (upward in FIG. 19). The groove width in the direction parallel to the optical axis 20a is thus reduced. Further, the cam width of the cam follower 162 in the sixth embodiment in the direction parallel to the optical axis 20a (up-down direction in FIG. 19) is reduced in correspondence with the shift of the first basic cam groove surface 101a and the second basic cam groove surface 101b (see the lower part of FIG. 19).

The cam follower 162 therefore has an increased cam width W2 in the circumferential direction and a reduced cam width W1 in the direction parallel to the optical axis 20a. The size of the cam follower 162 can therefore be reduced in the direction in which the optical axis 20a extends, while the cross-sectional area (mechanical strength) is increased, whereby the length of the cam ring 55 (see FIG. 5) can be shortened. As a result, the size and the thickness of the lens barrel 20 (see FIG. 5) and hence the size (thickness) of the digital still camera 10 (see FIG. 1) can be reduced.

The cam follower 162 engages with the cam groove 161 without any problem even when the cam width W1 decreases, because the portion having been removed is the region of the cam follower 162 that does not engage with the cam groove 161. Further, the decrease in the length of the cam ring 55 does not affect the travels of the first movable frame 52 (first lens group 21) and the second movable frame 53 (second lens group 22) shown in FIG. 5.

Embodiments of the invention have been described above, but the invention is not limited thereto and can be implemented in the following variations. For example:

(1) In the above embodiments, the digital still camera 10 is presented as an example of the imaging apparatus. In addition to this, the invention is applicable to a digital video camcorder, a mobile phone equipped with a camera, and other imaging apparatus.

(2) In the above embodiments, the cam groove 111 is provided on the inner circumferential side of the cam ring 55. Alternatively, the cam groove may be provided on the outer circumferential side of the cam ring, and a cam follower that engages with the cam groove may protrude inward. For example, when the holding frame (or movable frame) is disposed outside the cam ring in the radial direction thereof, the cam follower protrudes inward in the radial direction from the holding frame (movable frame) and engages with the cam groove on the outer circumferential side of the can ring.

(3) In the above embodiments, the second lens group 22 is held by the second movable frame 53 and movable along the optical axis 20a. Alternatively, the second imaging lens (second lens group) may be fixed. Further, in the above embodiments, the first movable frame 52 and the second movable frame 53 make reciprocating motion when the cam ring 55 is rotated, and the cam ring 55 moves along the optical axis 20a while rotating around the optical axis 20a. The axis around which the cam ring rotates does not necessarily coincide with the optical axis, and the cam ring does not necessarily move in the optical axis direction.

(4) In the above embodiments, the first movable frame 52 and the second movable frame 53 move along the optical axis 20a when the cam ring 55 is rotated. It is, however, noted that the cam ring and the holding member (or movable frame) only need to rotate relative to each other, and the cam ring may be moved by rotating the holding frame (movable frame). Further, in the above embodiments, the cam followers protrude outward from the first movable frame 52 and the second movable frame 53 and the respective cam grooves 111 are formed in the cam ring 55. Conversely, the cam followers are provided on the cam ring, and the cam grooves may be provided in the holding frame (movable frame).

The present application contains subject matter related to that disclosed in Japanese Priority Patent Application JP 2009-299298 filed in the Japan Patent Office on Dec. 30, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A lens barrel comprising:
a holding frame;
a cam ring rotatable relative to the holding frame around a rotational axis substantially parallel to an optical axis of an imaging optical lens system; and
a cam follower provided on the holding frame and a cam groove provided on the cam ring that engage with each other so that the holding frame and the cam ring move relative to each other along the optical axis when the holding frame and the cam ring are rotated relative to each other,
wherein when a shape of the cam groove is determined based at least in part on a shape of a basic cam groove, a groove surface positioned on an object side or an eyepiece side of a basic track of the basic cam groove is defined as a first basic cam groove surface, and a groove surface positioned on the other side of the basic track is defined as a second basic cam groove surface,
the shape of the cam groove produced by:
  shifting two portions of the second basic cam groove surface relative to each other in a circumferential direction of the cam ring, resulting in a shifted portion and a non-shifted portion;
  combining the shifted and non-shifted portions to form a produced basic cam groove surface;
  shifting the produced basic cam groove surface and the first basic cam groove surface relative to each other in a direction parallel to the optical axis; and
  combining the shifted produced basic cam groove surface and the shifted first basic cam groove surface so that a width of a resultant groove in a direction parallel to the optical axis is reduced.

2. A lens barrel comprising:
a holding frame;
a cam ring rotatable relative to the holding frame around a rotational axis substantially parallel to an optical axis of an imaging optical lens system; and
a cam follower provided on the holding frame and a cam groove provided on the cam ring that engage with each other so that the holding frame and the cam ring move relative to each other along the optical axis when the holding frame and the cam ring are rotated relative to each other,
wherein when a shape of the cam groove is determined based at least in part on a shape of a basic cam groove, a groove surface positioned on an object side or an eyepiece side of a basic track of the basic cam groove is defined as a first basic cam groove surface, and a groove surface positioned on the other side of the basic track is defined as a second basic cam groove surface,
the shape of the cam groove produced by:
  shifting two portions of the second basic cam groove surface relative to each other in a circumferential direction of the cam ring, resulting in a shifted portion and a non -shifted portion;
  combining the shifted and non-shifted portions to form a produced basic cam groove surface; and
  combining the produced basic cam groove surface and the first basic cam groove surface.

3. A lens barrel comprising:
a holding frame;
a cam ring rotatable relative to the holding frame around a rotational axis substantially parallel to an optical axis of an imaging optical lens system; and
a cam follower provided on the holding frame and a cam groove provided on the cam ring that engage with each other so that the holding frame and the cam ring move relative to each other along the optical axis when the holding frame and the cam ring are rotated relative to each other,
wherein when a shape of the cam groove is determined based at least in part on a shape of a basic cam groove, a groove surface positioned on an object side or an eyepiece side of a basic track of the basic cam groove is defined as a first basic cam groove surface, and a groove surface positioned on the other side of the basic track is defined as a second basic cam groove surface,
the shape of the cam groove produced by:
  shifting the first basic cam groove surface and the second basic cam groove surface relative to each other in a direction parallel to the optical axis; and
  combining the shifted first and second basic cam groove surfaces so that a width of a resultant groove in a direction parallel to the optical axis is reduced.

4. The lens barrel according to any one of claims 1 to 3, wherein the first basic cam groove surface and the second basic cam groove surface are symmetric in a cross section taken along a direction perpendicular to the basic track of the basic cam groove.

5. The lens barrel according to any one of claims 1 to 3, wherein the first basic cam groove surface and the second basic cam groove surface are asymmetric in a cross section taken along a direction perpendicular to the basic track of the basic cam groove.

6. An imaging apparatus comprising:
a holding frame;
a cam ring rotatable relative to the holding frame around a rotational axis substantially parallel to an optical axis of an imaging optical lens system; and
a cam follower provided on the holding frame and a cam groove provided on the cam ring that engage with each other so that the holding frame and the cam ring move relative to each other along the optical axis when the holding frame and the cam ring are rotated relative to each other, the shape of the cam groove produced by:
shifting two portions of the second basic cam groove surface relative to each other in a circumferential direction of the cam ring, resulting in a shifted portion and a non -shifted portion;
combining the shifted and non-shifted portions to form a produced basic cam groove surface;
shifting the produced basic cam groove surface and the first basic cam groove surface relative to each other in a direction parallel to the optical axis; and
combining the shifted produced basic cam groove surface and the shifted first basic cam groove surface so that a width of a resultant groove in a direction parallel to the optical axis is reduced.

* * * * *